United States Patent
Suzuki

(10) Patent No.: US 10,082,564 B2
(45) Date of Patent: Sep. 25, 2018

(54) OBJECT DETECTION DEVICE, SENSING DEVICE, MOVABLE BODY DEVICE, AND OBJECT DETECTION METHOD

(71) Applicant: Shingo Suzuki, Kanagawa (JP)

(72) Inventor: Shingo Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 315 days.

(21) Appl. No.: 14/996,778

(22) Filed: Jan. 15, 2016

(65) Prior Publication Data
US 2016/0209499 A1 Jul. 21, 2016

(30) Foreign Application Priority Data

Jan. 16, 2015 (JP) .................................. 2015-006719

(51) Int. Cl.
| | |
|---|---|
| *G01S 7/48* | (2006.01) |
| *G01S 7/481* | (2006.01) |
| *G01S 17/42* | (2006.01) |
| *G01S 17/89* | (2006.01) |
| *G01S 7/486* | (2006.01) |
| *G01S 17/93* | (2006.01) |

(52) U.S. Cl.
CPC .......... *G01S 7/4817* (2013.01); *G01S 7/4865* (2013.01); *G01S 17/42* (2013.01); *G01S 17/89* (2013.01); *G01S 17/936* (2013.01)

(58) Field of Classification Search
CPC .......... G01S 17/00; G01S 17/88; G01S 17/89; G01S 7/48; G08G 1/015; G08G 1/04; G01C 3/08
See application file for complete search history.

(56) References Cited

U.S. PATENT DOCUMENTS

2002/0140924 A1* 10/2002 Wangler ................ G01S 7/4802
  356/28
2014/0118718 A1* 5/2014 Jungwirth ............. G01S 17/325
  356/5.09

FOREIGN PATENT DOCUMENTS

| JP | 2006-215483 | 8/2006 |
|---|---|---|
| JP | 2009-063339 | 3/2009 |
| JP | 2009-069003 | 4/2009 |
| JP | 2011-085577 | 4/2011 |
| JP | 2011-128112 | 6/2011 |
| JP | 2012-107984 | 6/2012 |

* cited by examiner

*Primary Examiner* — Luke D Ratcliffe
(74) *Attorney, Agent, or Firm* — Oblon, McClelland, Maier & Neustadt, L.L.P.

(57) ABSTRACT

An object detection device includes an optical scanning system, a detection system, and a processing device. The optical scanning system includes a light source, a light source drive unit, and a deflector, and causes the deflector to scan a scan area with light from light source at scan positions. The detection system detects the light emitted from the optical scanning system and reflected by an object. The processing device calculates distance information indicating a distance to the object based on a light emission timing and a light detection timing. In a plurality of scans, the optical scanning system causes the light source to emit light at a different scan position in each scan. The processing device includes a correction system to correct the distance information at at least one scan position at which the light source is caused to emit light in at least one scan of the scans.

17 Claims, 17 Drawing Sheets

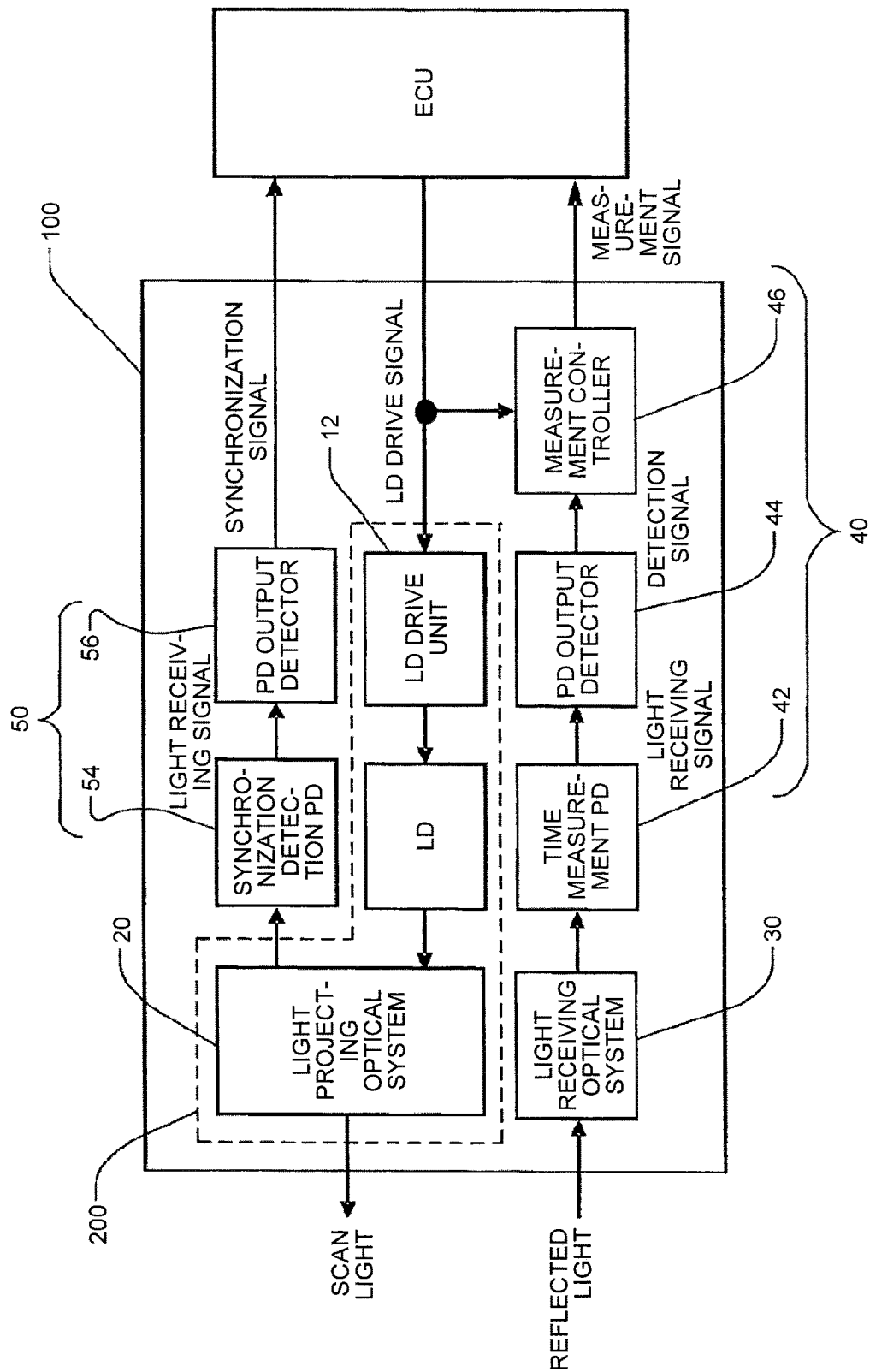

DETECTION DISTANCES OF OBJECTS A AND B AT EACH MEASUREMENT TIMING

DETECTION DISTANCES OF OBJECTS A AND B AT LAST MEASUREMENT TIMING IN SCAN 8

MEASUREMENT TIMING t1

MEASUREMENT TIMING t2

MEASUREMENT TIMING t2

ACTUAL DISTANCE AT EACH MEASUREMENT POINT IN SCAN 1
WHEN LAST MEASUREMENT POINT IS MEASURED IN SCAN 1

ACTUAL DISTANCE AT EACH MEASUREMENT POINT IN SCAN 8
WHEN LAST MEASUREMENT POINT IN SCAN 8 IS MEASURED

OBJECT DETECTION DEVICE, SENSING DEVICE, MOVABLE BODY DEVICE, AND OBJECT DETECTION METHOD

CROSS-REFERENCE TO RELATED APPLICATIONS

The present application claims priority to and incorporates by reference the entire contents of Japanese Patent Application No. 2015-006719 filed in Japan on Jan. 16, 2015.

BACKGROUND OF THE INVENTION

1. Field of the Invention

The present invention relates to an object detection device, a sensing device, a movable body device, and an object detection method.

2. Description of the Related Art

Recently, development of devices capable of detecting a distance to an object has been actively conducted (see, for example, Japanese Patent Application Laid-open No. 2011-128112, Japanese Patent Application Laid-open No. 2009-063339, Japanese Patent Application Laid-open No. 2012-107984, and Japanese Patent Application Laid-open No. 2009-069003).

However, it is difficult for the conventional devices to achieve both a longer distance and a higher accuracy of the detection distance.

SUMMARY OF THE INVENTION

It is an object of the present invention to at least partially solve the problems in the conventional technology.

An object detection device includes an optical scanning system, a detection system, and a processing device. The optical scanning system includes a light source, a light source drive unit configured to drive the light source, and a deflector configured to deflect light from the light source, and causes the deflector to scan a scan area with light from the light source at a plurality of scan positions of the deflector. The detection system detects the light emitted from the optical scanning system and reflected by an object. The processing device calculates distance information indicating a distance to the object based on an emission timing of the light source and a detection timing of the detection system. In a plurality of scans, the optical scanning system causes the light source to emit light at a different scan position of the deflector in each scan. The processing device includes a correction system configured to correct the distance information at at least one of the plurality of scan positions at which the light source is caused to emit light in at least one scan of the scans.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram of a schematic configuration of an object detection device according to an embodiment;

DETAILED DESCRIPTION OF THE PREFERRED EMBODIMENTS

Figure 2A:
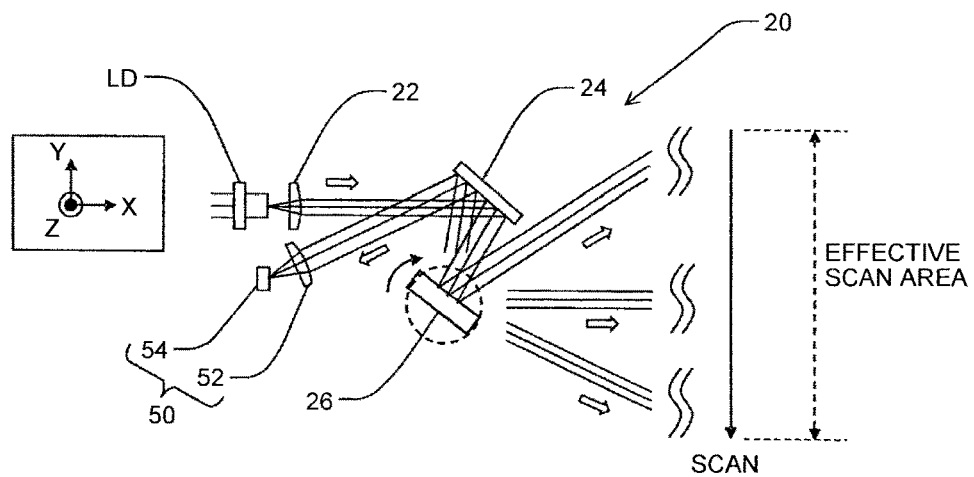
FIG. 2A is a diagram for explaining a light projecting optical system and a synchronization system.

An object detection device 100 according to an embodiment of the present invention will be explained below with reference to FIG. 1 to FIG. 15.

FIG. 1 is a diagram of a schematic configuration of the object detection device 100.

The object detection device 100 is, for example, a scanning laser radar which is mounted in an automobile as a movable body, and emits light and receives a reflected light (scattering light) from an object (e.g., a preceding vehicle, a parked vehicle, an obstacle, and a pedestrian) to measure a distance to the object. The object detection device 100 is supplied with power from, for example, a battery of the automobile.

As illustrated in FIG. 1, the object detection device 100 includes a laser diode (LD) as a light source, an LD drive unit 12, a light projecting optical system 20, a light receiving optical system 30, a detection system 40, a synchronization system 50, and the like.

The LD is also called "edge-emitting laser", which is driven by the LD drive unit 12 and emits a laser beam. The LD drive unit 12 turns on the LD (i.e., causes the LD to emit light) by using an LD drive signal (rectangular pulse signal) output from an engine controller (ECU) of the automobile. The LD drive unit 12 includes, for example, a capacitor connected to the LD so that current can be supplied thereto, a transistor for switching conduction/non-conduction between the capacitor and the LD, and a charging unit that can charge the capacitor.

Figure 2B:
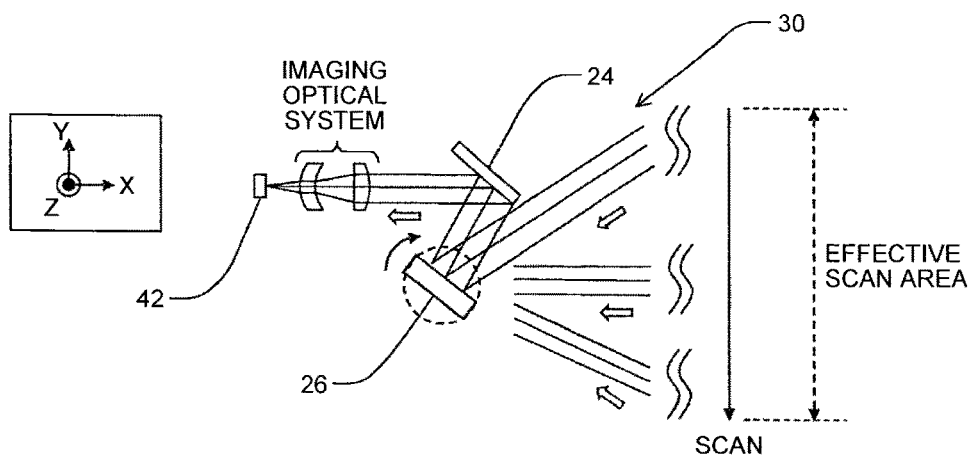
FIG. 2B is a diagram for explaining a light receiving optical system.

FIG. 2A schematically represents the light projecting optical system 20 and the synchronization system 50. FIG. 2B schematically represents the light receiving optical system 30. These systems will be explained below by appropriately using an XYZ three-dimensional orthogonal coordinate system in which a Z-axis direction illustrated in FIG. 2A, etc. is set as a vertical direction.

As illustrated in FIG. 2A, the light projecting optical system 20 includes a coupling lens 22 disposed on a light path of light emitted from the LD, a reflecting mirror 24 disposed on the light path of the light through the coupling lens 22, and a rotating mirror 26 as a deflector disposed on the light path of the light reflected by the reflecting mirror 24. In order to downsize the device, the light path is folded by disposing the reflecting mirror 24 on the light path between the coupling lens 22 and the rotating mirror 26.

Therefore, after the light emitted from the LD is shaped into light of a predetermined beam profile by the coupling lens 22, the shaped light is reflected by the reflecting mirror 24 and is deflected around the Z-axis by the rotating mirror 26.

The light deflected by the rotating mirror 26 in a predetermined deflection range around the Z-axis is the light projected from the light projecting optical system 20, i.e., the light emitted from the object detection device 100.

The rotating mirror 26 has a reflective surface and reflects (deflects) the light from the reflecting mirror 24 while rotating around a rotation axis (Z-axis), and thereby one-dimensionally scans an effective scan area corresponding to the deflection range using the light in a horizontal single-axis direction (herein, Y-axis direction). In this case, the deflection range and the effective scan area are +X side of the object detection device 100.

As can be seen from FIG. 2A, the rotating mirror 26 has two reflective surfaces (two opposed surfaces); however, the rotating mirror is not limited thereto, and therefore it may have one surface or three surfaces. In addition, at least two reflective surfaces are provided, and the reflective surfaces are arranged at different angles with respect to the rotation axis of the rotating mirror, and this makes it also possible to change an area to be scanned and detected into the Z-axis direction.

In other words, an optical scanning system 200 is configured to include the LD, the LD drive unit 12, and the light projecting optical system 20 and to scan the effective scan area with the light (see FIG. 1).

As illustrated in FIG. 2B, the light receiving optical system 30 includes the rotating mirror 26 that reflects the light projected from the light projecting optical system 20 and reflected (scattered) by an object in the effective scan area, the reflecting mirror 24 that reflects the light from the rotating mirror 26, and an imaging optical system disposed on the light path of the light reflected from the reflecting mirror 24 to cause the light to form an image on a time measurement photodiode (PD) 42 explained later.

Figure 2C:
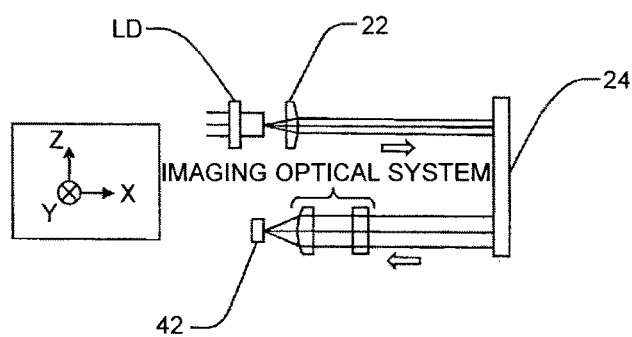
FIG. 2C is a schematic diagram of an optical path of light from an LD to a reflecting mirror and an optical path of light from the reflecting mirror to a time measurement PD.

FIG. 2C represents the light path from the LD to the reflecting mirror 24 and the light path from the reflecting mirror 24 to the time measurement PD 42.

As can be seen from FIG. 2C, the light projecting optical system 20 and the light receiving optical system 30 are arranged so as to be superposed in the Z-axis direction, and the rotating mirror 26 and the reflecting mirror 24 are used in common by the light projecting optical system 20 and the light receiving optical system 30. This makes it possible to reduce a relative positional displacement between an emitting range of the LD on the object and a light receivable range of the time measurement PD 42, thus achieving stable object detection.

As illustrated in FIG. 2B and FIG. 1, the detection system 40 includes the time measurement PD 42, a PD output detector 44, and a measurement controller 46. The time measurement PD 42 receive the light projected from the light receiving optical system 30 and reflected (scattered) by the object in the effective scan area through the light receiving optical system 30. The PD output detector 44 detects a light receiving signal (output signal) of the time measurement PD 42. The measurement controller 46 calculates a distance to the object based on a time difference between a rising timing of an LD drive signal and a detection timing of the light receiving signal in the PD output detector 44.

Then, the light projected from the light projecting optical system 20 and reflected (scattered) by the object is guided to the imaging optical system through the rotating mirror 26 and the reflecting mirror 24, to be converged to the time measurement PD 42 by the imaging optical system (see FIG. 2B). As illustrated in FIG. 2B, to downsize the device, the light path is folded by providing the reflecting mirror 24 between the rotating mirror 26 and the imaging optical system. Although the imaging optical system is formed of two lenses herein, one lens may be used, three or more lenses may also be used, and a mirror optical system may be used.

As illustrated in FIG. 2A and FIG. 1, the synchronization system 50 includes a synchronization lens 52 disposed on the light path of the light that is emitted from the LD and reflected by the reflecting mirror 24 through the coupling lens 22 and deflected by the rotating mirror 26 and again reflected by the reflecting mirror 24, a synchronization detection PD 54 disposed on the light path of the light through the synchronization lens 52, and a PD output detector 56 for detecting an output signal of the synchronization detection PD 54.

More specifically, the reflecting mirror 24 is disposed on an upstream side of the rotating mirror 26 in its rotation direction with respect to the deflection range, and the light deflected by the rotating mirror 26 to the upstream side of the deflection range is incident on the reflecting mirror 24. The light deflected by the rotating mirror 26 and reflected by the reflecting mirror 24 is then incident on the synchronization detection PD 54 through the synchronization lens 52.

The reflecting mirror 24 may be disposed on a downstream side of the rotating mirror 26 in its rotation direction with respect to the deflection range. The synchronization system 50 may be disposed on the light path of the light deflected by the rotating mirror 26 and reflected by the reflecting mirror 24.

The signal is output from the synchronization detection PD 54 each time the light reflected by each of the reflective surfaces of the rotating mirror 26 due to the rotation of the rotating mirror 26 is received by the synchronization detection PD 54. In other words, the signal is periodically output from the synchronization detection PD 54.

In this way, by performing synchronous lighting for irradiating the synchronization detection PD 54 with the light from the rotating mirror 26, it is possible to obtain a rotation timing of the rotating mirror 26 from a light receiving timing in the synchronization detection PD 54.

Therefore, by causing the LD to pulse-light (i.e., to emit a pulsed light) after a predetermined time elapses from the synchronous lighting of the LD, it is possible to optically scan the effective scan area. In other words, by causing the LD to pulse-light in a period before and after the timing at which the synchronization detection PD 54 is irradiated with the light, the effective scan area can be optically scanned.

As a photodetector used for time measurement and synchronization detection, it is possible to use, in addition to the PD, an avalanche photo diode (APD), a single photon avalanche diode (SPAD) which is a Geiger mode APD, or the like. The APD and the SPAD have advantages in detection precision and detection distance because both of them are highly sensitive to the PD.

Figure 3:
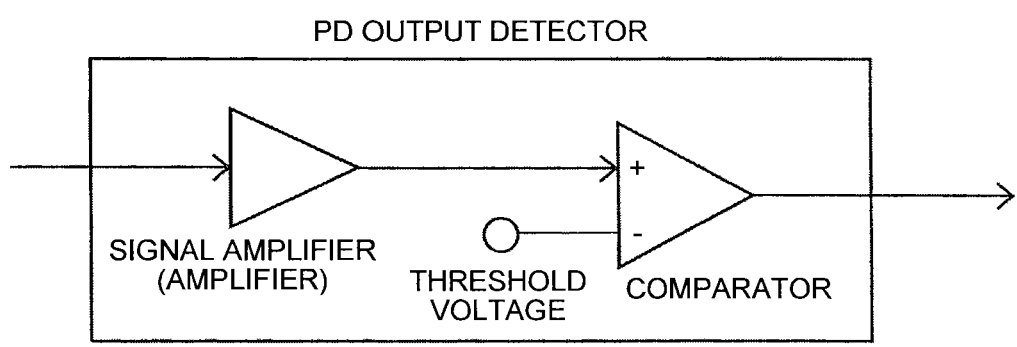
FIG. 3 is a diagram of a configuration example of a PD output detection circuit.

FIG. 3 represents an example of a PD output detector in the detection system 40 and the synchronization system 50. The operation of the PD output detector includes two operations, signal amplification of a light receiving signal and timing detection of a light receiving signal. The signal amplification of the light receiving signal is implemented by amplifying the signal by using a signal amplifier such as an amplifier, and the timing detection of a light receiving signal is implemented by detecting a rising waveform portion which becomes a given output (threshold level) of the light receiving signal from the PD or higher by using a comparator or the like. In other words, the PD output detector can obtain the light receiving signal as a binarized logic signal using the comparator.

When detecting the light receiving signal (rising waveform portion) of the synchronization detection PD 54, the PD output detector 56 outputs the synchronization signal (the binarized logic signal) to the ECU.

The ECU generates an LD drive signal based on the synchronization signal from the PD output detector 56, and outputs the LD drive signal to the LD drive unit 12 and the measurement controller 46.

Figure 8:
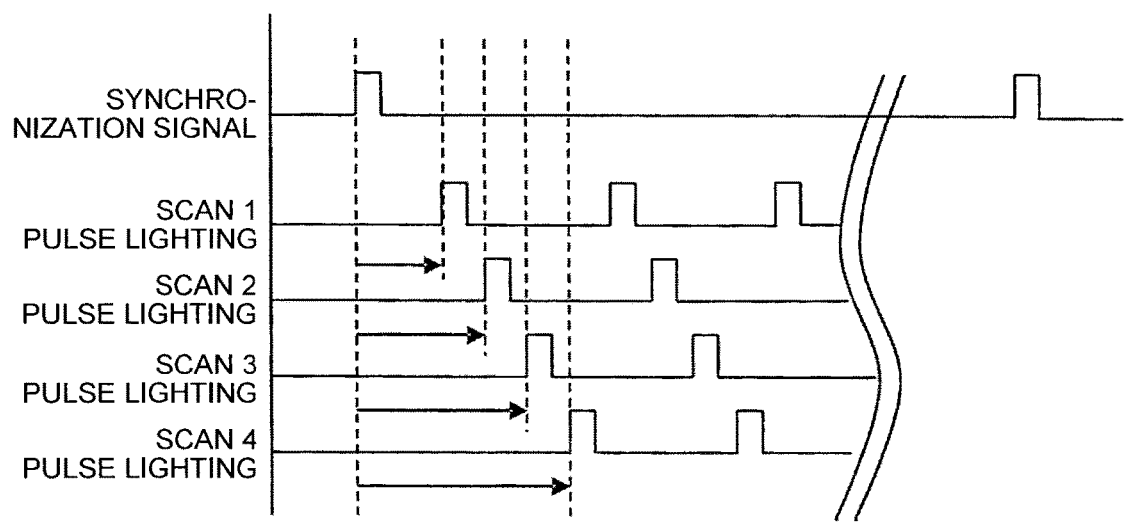
FIG. 8 is a timing chart illustrating an output timing of a synchronization signal and scan start timings of a plurality of scans.

The LD drive signal is formed of a synchronization signal and a pulse lighting signal (periodic pulse signal) delayed from the synchronization signal (see FIG. 8).

When detecting the light receiving signal (rising waveform portion) of the time measurement PD 42, the PD output detector 44 outputs a detection signal (rectangular pulse signal) to the measurement controller 46.

The measurement controller 46 calculates, for example, a time difference between a rising timing of the LD drive signal from the ECU and a rising timing of the detection signal from the PD output detector 44 and converts the time difference into a distance to thereby calculate a reciprocation distance to an object, and outputs the result of calculation as a measurement signal to the ECU. The measurement controller 46 includes a correction system for correcting distance information indicating a distance to the calculated object, as explained later.

The ECU performs, for example, steering control and speed control of an automobile based on the measurement signal from the measurement controller 46. The speed control of an automobile includes, for example, automatic brake (auto brake).

Figure 4A:
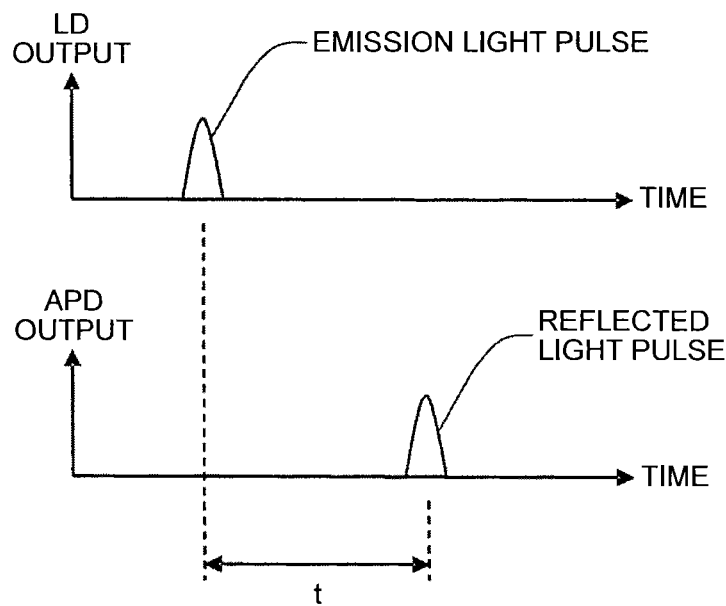
FIG. 4A is a diagram of an emission light pulse and a reflected light pulse.

In scanning the effective scan area by the rotating mirror 26, the LD drive unit 12 drives the LD to emit a pulsed light (hereinafter, also called "emission light pulse") as illustrated in FIG. 4A. The pulsed light (hereinafter, also called "reflected light pulse") emitted from the LD and reflected (scattered) by the object is detected by the time measurement PD 42 (in FIG. 4A, the APD is used as the photodetector instead of the PD).

Figure 4B:
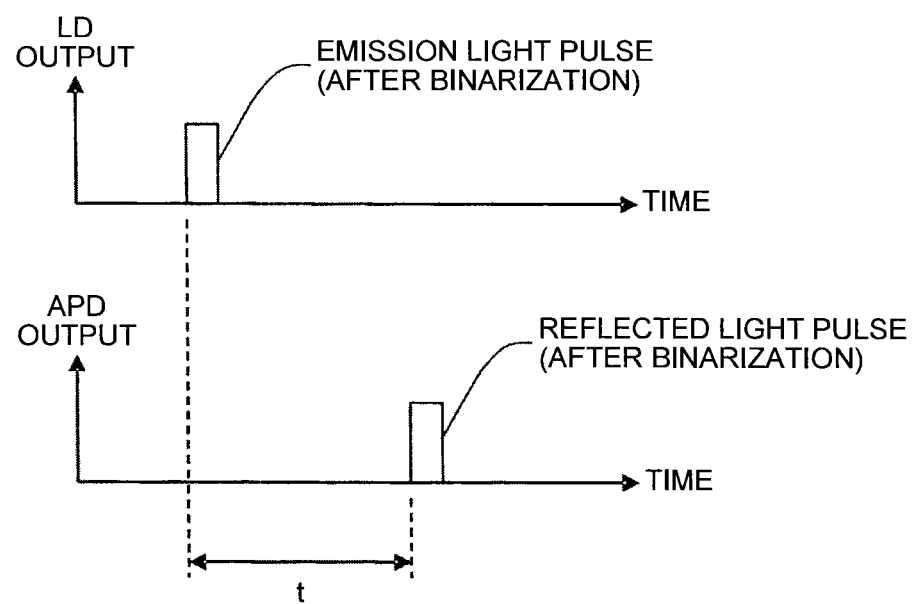
FIG. 4B is a diagram of an emission light pulse after binarization and a reflected light pulse after binarization.

By measuring a time t from when the LD emits the emission light pulse until the APD detects the reflected light pulse, it is possible to calculate a distance to the object. For the time measurement, as illustrated in FIG. 4B, for example, it may be configured such that an emission light pulse is detected by the photodetector such as the PD and is changed to a binarized rectangular pulse; a reflected light pulse is changed to a rectangular pulse binarized in the PD output detector; a time difference t between rising timings of both the rectangular pulses is measured by a time measurement circuit. Alternatively, it may be configured such that the time t is measured by performing analog-to-digital (A/D) conversion on respective waveforms of the emission light pulse and the reflected light pulse to be converted into digital data; and by performing correlation calculation on an output signal of the LD and an output signal of the APD.

Next, a method for emitting a pulsed light from the LD at an arbitrary time interval and detecting an object present within a detection range (effective scan area) will be explained with reference to FIG. 5A to FIG. 5C.

Figure 5A:
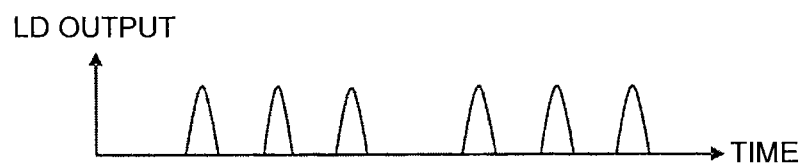
FIG. 5A to FIG. 5C are diagrams of examples (part 1 to part 3) of how to detect respective detection ranges (effective scan areas) by one scan.
Figure 5B:
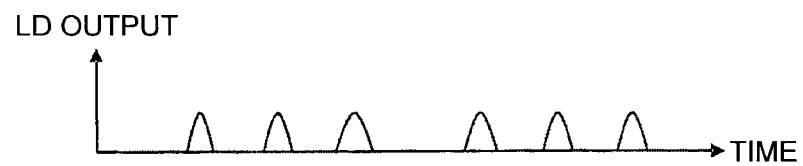
Figure 5C:
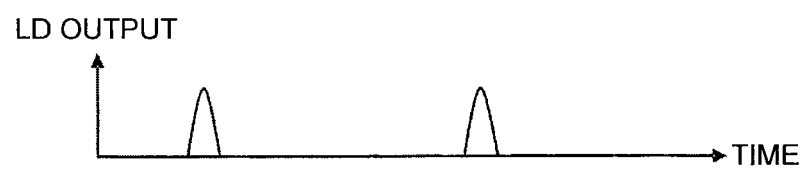

FIG. 5A to FIG. 5C are diagrams each representing a method for detecting a plurality of measurement points (scan positions) in the detection range (effective scan area) by a single scan.

In FIG. 5A, although an output of the LD is set to be slightly higher in order to make longer the detection distance, there are problems that the life of the LD may be reduced and the LD may be damaged due to LD duty specifications.

To maintain a higher output of the LD while solving these problems, it is necessary to make longer the time interval (pulse emission period) for emitting pulsed lights as illustrated in FIG. 5C, but the number of measurement points becomes very small.

To solve this problem, as illustrated in FIG. 5B, the output of the LD can be suppressed to a value in the specification range, but it is not possible to obtain a sufficient detection distance.

As a result, it is difficult to achieve both the longer distance of the detection distance and the sufficiency of the measurement points by a single scan while suppressing the short life and the damage of the LD.

Figure 6:
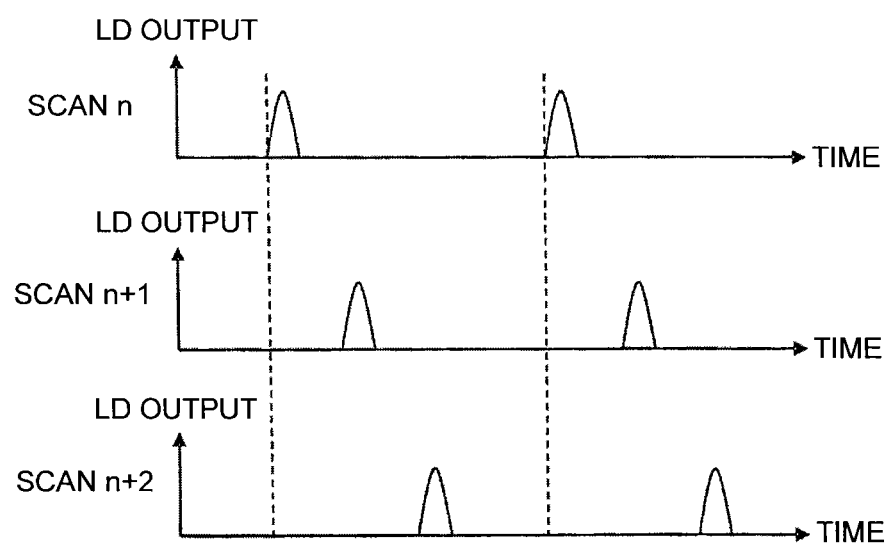
FIG. 6 is a diagram for explaining examples of how to detect the detection range separately by a plurality of scans.

Therefore, as illustrated in FIG. 6, another method is considered, the method being implemented by detecting a plurality of measurement points (scan positions) in the detection range (effective scan area) in such a manner that a plurality of scans (e.g., three) are separately performed i.e. thinning scanning (also called "interlaced scanning") is performed.

If this method is used, the output of the LD can be set to be higher in each scan and the pulse emission period can be made longer, and therefore, the output of the LD and the number of measurement points can be made the same as the case illustrated in FIG. 5A while suppressing the short life and the damage of the LD. In other words, it is possible to achieve both the longer distance of the detection distance and the sufficiency of the measurement points while suppressing the short life and the damage of the LD.

However, according to the method (detection by thinning scanning), it takes more detection time for three scans to detect all the measurement points in the effective scan area.

Next, an error between a detection distance detected at an arbitrary measurement point and stored (saved) in a storage medium (e.g., memory and hard disk) and an actual distance in an arbitrary time will be explained with reference to FIG. 7A to FIG. 7C.

Figure 7A:
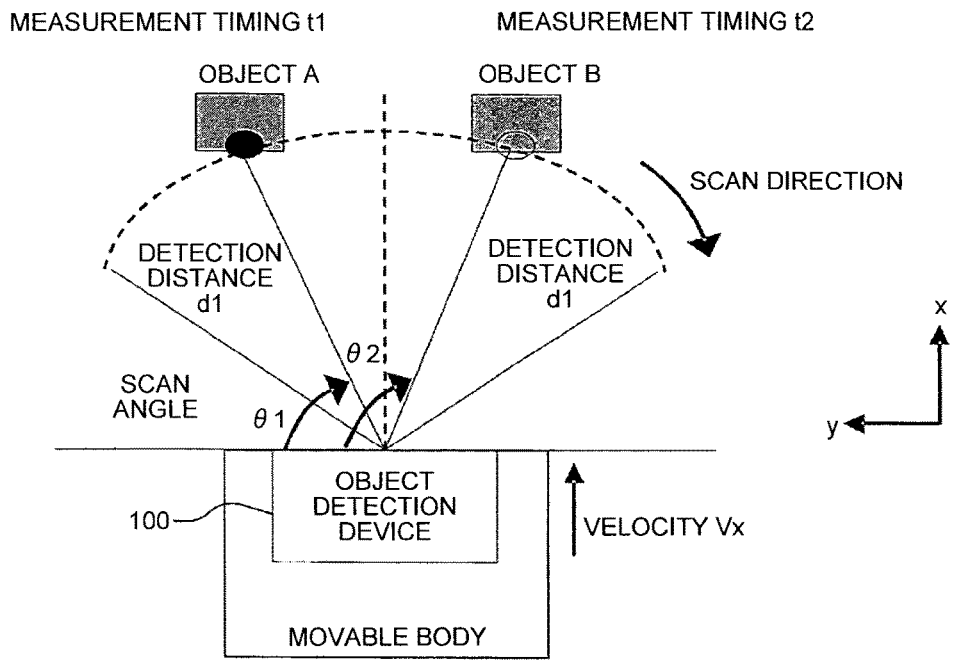
FIG. 7A to FIG. 7C are diagrams (part 1 to part 3) for explaining an error between a detection distance obtained by being detected at each arbitrary measurement point and stored in a storage medium, and an actual distance in an arbitrary time after detection.

FIG. 7A represents an example of how to detect two objects A and B which stand still at positions in which distances from the object detection device 100 mounted in the movable body are the same as each other.

As illustrated in FIG. 7A, the object A and the object B are located at different positions related to the scan direction (the object A is on the upstream side of the object B in the scan direction herein). In this case, there is a time difference Δt between measurement timings of the object A and the object B for a scan time from the object A to the object B. Scan angles with respect to the object A and the object B are set to θ1 and θ2, respectively.

For example, when the object A and the object B are detected in the same scan, the time difference Δt is a scan time for a scan angle (θ2−θ1). Moreover, for example, when the object B is detected in the next scan after the scan of the object A, the time difference Δt is a time obtained by adding a time, during which the scan angle becomes next θ2 after the scan angle becomes θ2, to the scan time for the scan angle (θ2−θ1).

Figure 7B:
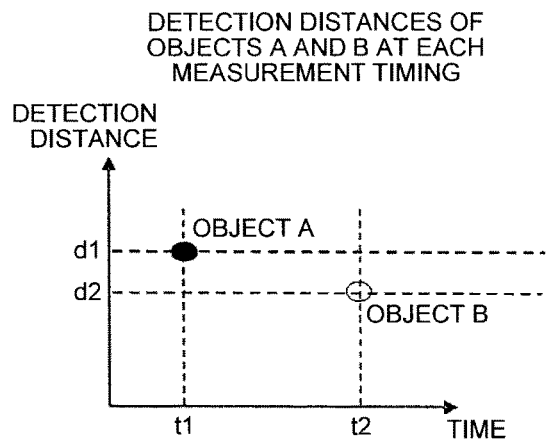
Figure 7C:
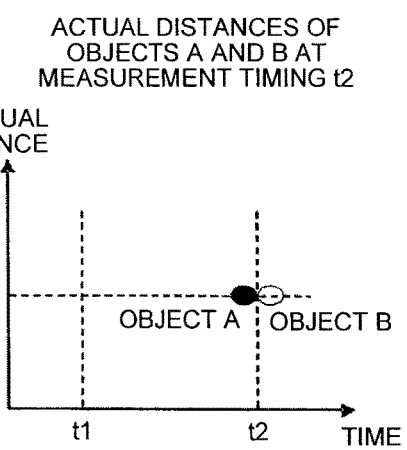

When the movable body mounted with the object detection device 100 is moving in an arrow direction (X-axis direction) at a velocity Vx, as illustrated in FIG. 7B and FIG. 7C, a detection distance d2 of the object B, at a measurement timing t2 of the object B, is an accurate distance to the object B. However, for the object A detected at a measurement timing t1 which is earlier than the measurement timing t2 of the object B, the detection distance is d1 as illustrated in FIG. 7B, while an actual distance at the measurement timing t2 of the object B is d2 as illustrated in FIG. 7C.

In other words, the detection distance of the object A is not updated until the object A is next detected, and therefore, the distance (actual distance) at an arbitrary time after the measurement timing t1 and before the update becomes shorter than the detection distance at the measurement timing t1. As illustrated in FIG. 6, when the detection range is detected separately by a plurality of scans, for example, if the object A is detected in a first scan and the object B is detected in a third scan after two scans, a time difference between the different scans becomes considerably large. Therefore, the error between the detection distances (a difference between the distances of the object A in FIG. 7B and FIG. 7C) becomes also large. Likewise, at this time also, the detection distance of the object A is not updated until the object A is next detected.

Then, at an arbitrary time, for example, at the measurement timing t2 of FIG. 7A, an error between an actual distance of the object A at the measurement timing t2 and a detection distance of the object A at the measurement timing t1 is calculated from the speed information of the movable body mounted with the object detection device 100 and the detection information of the object A and is corrected.

Thereby, the actual distance of the object A (see FIG. 7C) at the measurement timing t2 can be calculated.

By performing the correction, it is possible to obtain accurate distance information of the object A earlier than the time at which the object A is next detected after the object A is detected.

First Example

A first example will be explained below with reference to FIG. 7A to FIG. 7C. The first example is an example of the method for correcting the detection distance of the object A at the measurement timing t2 of the object B. To simply explain how the error occurs between the detection distance of the object A and the actual distance after the measurement timing t1, the objects are assumed to be in a resting state. In this case, the correction of the detection distance can be performed by the correction system of the measurement controller 46.

Control Conditions of Object Detection Device

Number of surfaces of rotating mirror=2 [surface]

Rotation speed of rotating mirror=2000 [rpm]

Positions and Velocity Conditions in FIG. 7A

Scan angle θ1 of object A=60 [degree]

Scan angle θ2 of object B=120 [degree]

Velocity Vx of movable body with object detection device=120 [km/h]

Moving velocity Ux of objects A and B=0 [km/h](Resting state)

Pulse emission interval (Pulse period)=50 [us]

Detection Distance

Detection distance d1 of object A at measurement timing t1=100.00 [m]

Detection distance d2 of object B at measurement timing t2=99.90 [m]

Hereinafter, the detection distance of the object A at the measurement timing t1 is represented as d1, and the detection distance of the object B at the measurement timing t2 is represented as d2. The actual distance of the object A at the measurement timing t2 is represented as d1(*t2*), and the distance after being corrected is represented as d1'(*t2*). The actual distance of the object B at the measurement timing t2 is represented as d2(*t2*). The detection distance d1 is stored in a storage medium by the measurement controller 46.

First of all, when the movable body and the objects are in the resting state, at the measurement timing t2, both the detection distances d1 and d2 of the objects A and B are 100.00 [m], and both the actual distance d1(*t2*) of the object A and the distance d1'(*t2*) after correction are 100.00 [m].

Then, as above conditions, when the movable body moves in the arrow direction (+X direction) of FIG. 7A at a velocity of 120 [km/h] and the objects are in the resting state, the measurement controller 46 stores the detection distance d1=100.00 [m] of the object A at the measurement timing t1 and the detection distance d2=99.90 [m] of the object B at the measurement timing t2 in the storage medium, as the detection distance at the measurement timing t2.

However, because the movable body is moving, both the actual distances d1(*t2*) and d2(*t2*) of the objects A and B at the measurement timing t2 are 99.90 [m], and an error occurs between the detection distance and the actual distance of the object A. The detection distance d1 of the object A is not updated until the object A is next detected, and therefore, when the current movement of the movable body is continued, the error gradually increases as time passes until the object A is next detected.

Therefore, the correction is made by estimating and calculating the actual distance of the object A at the timing of correcting the detection distance d1 of the object A after the measurement timing t1 or at the measurement timing t2 according to the present embodiment. In actual cases, all the measurement points from the next measurement point of the previous object B to the measurement point immediately before the current object B are corrected using the same method.

First of all, as illustrated in FIG. 7A and FIG. 7B, the detection distance d1 of the object A at the measurement timing t1 is 100.00 [m], and the detection distance d2 of the object B at the measurement timing t2 is 99.90 [m].

Then, as illustrated in FIG. 7C, at the measurement timing t2, the actual distance d2(t2) of the object B is 99.90 [m] but the actual distance of the object A is shorter than the detection distance d1=100.00 [m] stored in the storage medium because the movable body is moving at the velocity Vx.

The correction distance d1'(t2) of the detection distance d1 of the object A at the measurement timing t2 can be calculated by the following Equation (1).

$$d1'(t2)=d1-(t2-t1)\times Vx/\sin \theta 1 \quad (1)$$

A rotation time per one surface of the rotating mirror is {1/(2000 [rpm]/60)}/2[surface]=0.015 [s], and therefore, a scan time from the object A to the object B is 0.015 [s]×(60 [degree]/360 [degree])=0.0025 [s] from a scan angle from the object A to the object B: (θ2−θ1)=120 [degree]−60 [degree]=60 [degree].

Therefore, the correction distance d1'(t2) of the object A at the measurement timing t2 is calculated as follows from the Equation (1): d1'(t2)=100.00[m]−0.0025 [s]×(120 [km/h]×1000/3600)/sin {2π[rad]×(60 [degree]/360 [degree])}=99.90[m].

Then, the detection distance d1=100.00 [m] of the object A stored in the storage medium is updated (rewritten) with the calculated correction distance d1'(t2)=99.90 [m].

As a result, the accurate position information (distance information) of the object A can be obtained before the object A is next detected after the detection of the object A. In other words, it is possible to obtain the accurate position information of the object A before the update period of the detection distance of the object A from the detection of the object A.

Incidentally, as explained above, the scanning of the effective scan area is started after a predetermined time elapses since detection of the light by the synchronization detection PD 54 disposed on the upstream side of the rotating mirror 26 in its rotation direction in the effective scan area. Therefore, when a plurality of scan positions in the effective scan area are scanned separately by a plurality of scans, the predetermined time is set in each scan and LD emission timing is determined.

Because the rotating mirror 26 is rotating, a signal is output from the synchronization detection PD 54 each time the light reflected by one of the reflective surfaces is irradiated to the synchronization detection PD 54, and the signal is detected by the PD output detector 56. Therefore, a synchronization signal is periodically output from the PD output detector 56.

FIG. 8 is a timing chart representing a relationship between an output timing of the synchronization signal from the PD output detector 56 and an emission timing of the LD in each scan of scans 1 to 4 when the emission of the LD at the scan positions (measurement points) in the effective scan area is scanned separately by four scans (scans 1 to 4). As can be seen from FIG. 8, in the scans 1 to 4, the LD is driven by pulse emission signals each of which is delayed with respect to the synchronization signal and a delay time is different between scans. The delay time is gradually increased from the scan 1 to the scan 4.

Second Example

A second example will be explained below with reference to FIG. 9A to FIG. 9C. The second example is an example of how to detect a plurality of measurement points (scan positions) in the detection range (effective scan area) separately by eight scans (scans 1 to 8). In this case also, the correction of the detection distance can be performed by the correction system of the measurement controller 46.

Here, the measurement point (scan position) corresponds to a rotational position of the rotating mirror because the measurement point changes when a rotation angle of the rotating mirror 26 changes. Furthermore, for example, when the detection range (effective scan area) is in a range of θ1 to θ2, the range of 0 degrees to θ1 and the range of θ2 to 180 degrees are outside the effective scan area.

Herein, the object A is detected at a first measurement point a in the scan 1 at the measurement timing t1, and the detection distance is set to be d1; the object B is detected at a last measurement point b in scan 8 at the measurement timing t2, and the detection distance is set to be d2; the detection distance d1 at the measurement timing t1 of the object A is corrected at the measurement timing t2; and the correction distance d1'(t2) is calculated. The detection distance d1 is stored in the recording medium by the measurement controller 46.

Figure 9A:
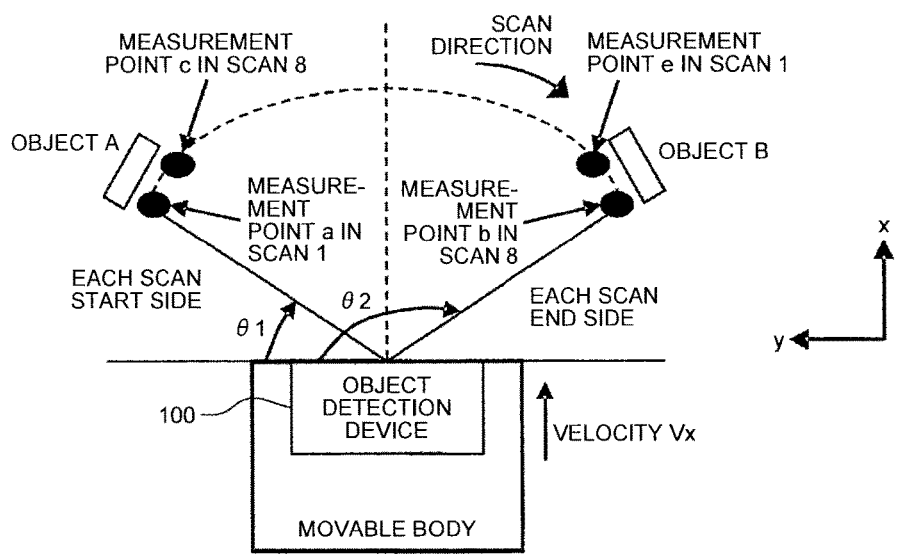
FIG. 9A to FIG. 9C are diagrams (part 1 to part 3) for explaining examples of how to detect a plurality of measurement points in respective detection ranges (effective scan areas) separately by eight scans.

Control Conditions of Object Detection Device
Number of surfaces of rotating mirror=2 [surface]
Rotation speed of rotating mirror=2000 [rpm]
Positions and Velocity Conditions in FIG. 9A
Scan angle θ1 of object A=60 [degree], detected in scan 1 at measurement timing t1
Scan angle θ2 of object B=120 [degree], detected in scan 8 at measurement timing t2
Velocity Vx of movable body with object detection device=120 [km/h]
Moving velocity Ux of objects A and B=0 [km/h](Resting state)
Distance Detected upon Measurement
Detection distance d1 of object A at measurement timing t1=100.00 [m]
Detection distance d2 of object B at measurement timing t2=95.86 [m]

The correction distance d1'(t2) of the object A at the measurement timing t2 can be calculated by the Equation (1) similarly to the first example.

Because the rotation time per one surface of the rotating mirror is 0.015 [s], there are 7 scans and a scan angle of 60 [degree] from the object A to the object B, and a scan time from the object A to the object B is 0.015 [s]×{7[scan]+(60 [degree]/360 [degree])}=0.1075 [s].

Therefore, the correction distance d1'(t2) of the object A at the measurement timing t2 is calculated as follows from the Equation (1): d1'(t2)=100.00[m]−0.1075 [s]×(120 [km/h]×1000/3600)/sin {2π[rad]×(60 [degree]/360 [degree])}=95.86[m].

Then, the detection distance d1=100.00 [m] of the object A stored in the storage medium is updated (rewritten) with the calculated correction distance d1'(t2)=95.86 [m].

By performing the correction, it is possible to obtain the accurate position information of the object A before the object A is next detected after the detection of the object A.

Figure 10:
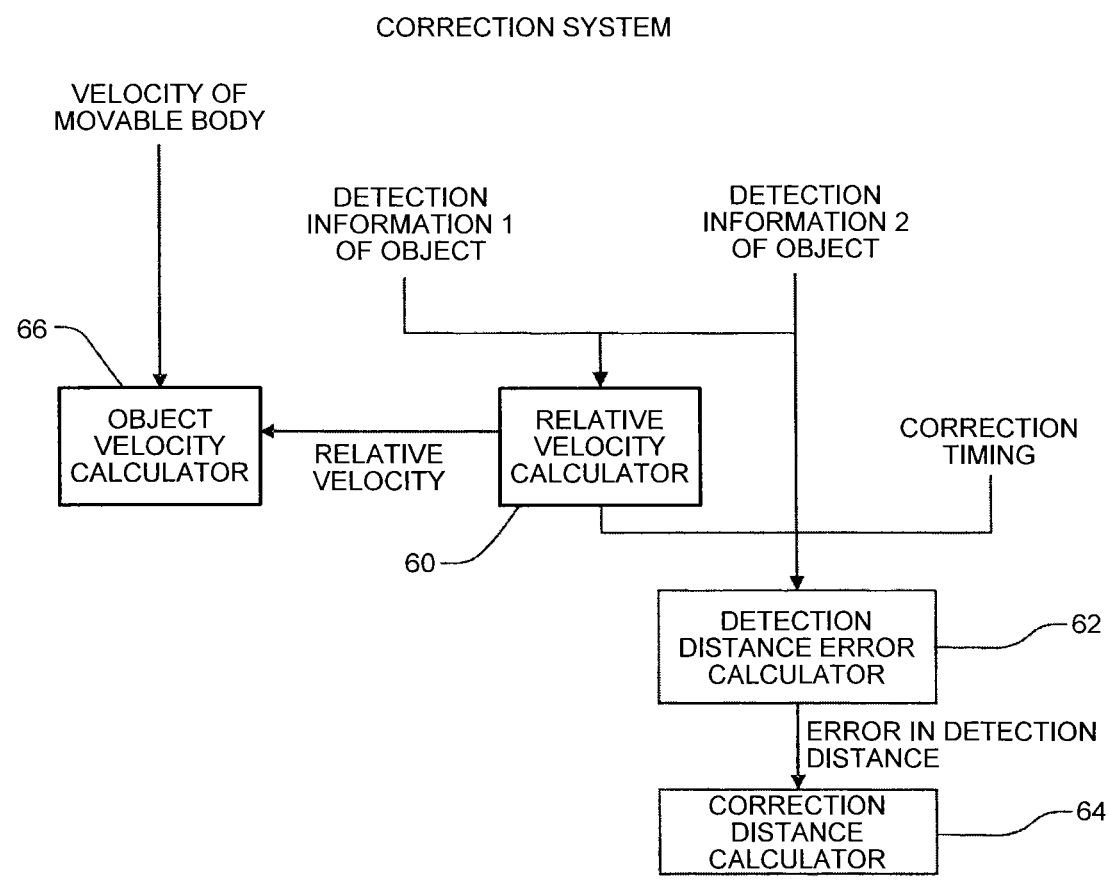
FIG. 10 is a block diagram of a configuration example of a correction system.

FIG. 10 is a block diagram of an example of a correction system provided in the measurement controller 46. As illustrated in FIG. 10, the correction system includes a relative velocity calculator 60, a detection distance error calculator 62, a correction distance calculator 64, and an object velocity calculator 66.

The relative velocity calculator 60 calculates relative velocity information between the movable body and an object based on pieces of object detection information 1 and 2, and outputs the result of calculation to the detection distance error calculator 62 and the object velocity calculator 66.

The detection distance error calculator 62 calculates an error (detection distance error) between the detection distance and actual distance information (distance at a correction timing) based on the relative velocity information from the relative velocity calculator 60, the pieces of object detection information 1 and 2, and the correction timing.

The correction distance calculator 64 calculates a correction distance based on the detection distance error from the detection distance error calculator 62.

The object velocity calculator 66 calculates a velocity of an object based on the velocity of the movable body and the relative velocity between the movable body and the object from the relative velocity calculator 60. The velocity of the movable body may be acquired from, for example, a speed detection system of the movable body or may be measured by using a speed detector.

A procedure performed by the correction system will be specifically explained next. First of all, the measurement controller 46 calculates relative velocity information between the movable body and an object using the relative velocity calculator 60 from the detection information (e.g., the detection information 1 and 2) obtained by measuring the object determined as the same object and already detecting the object at least twice. Each piece of the detection information includes, for example, a detection distance, a detection position (scan angle), and a measurement timing of the object.

Figure 11A:
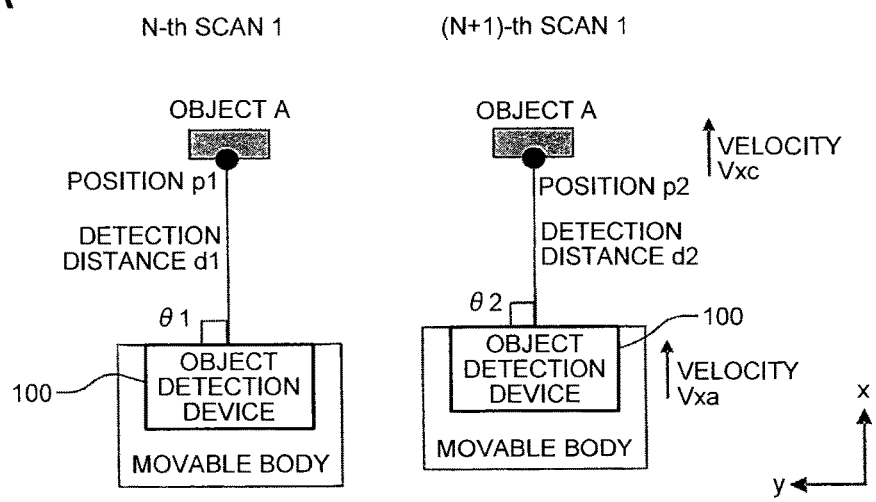
FIG. 11A and FIG. 11B are diagrams (part 1 and part 2) for explaining examples of how to detect an object in front of a movable body.
Figure 11B:
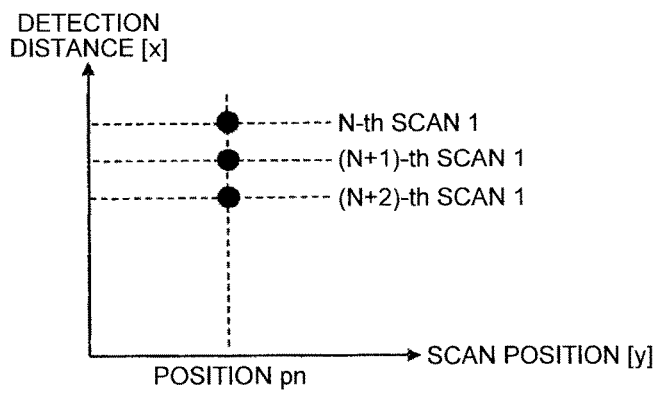
Figure 11C:
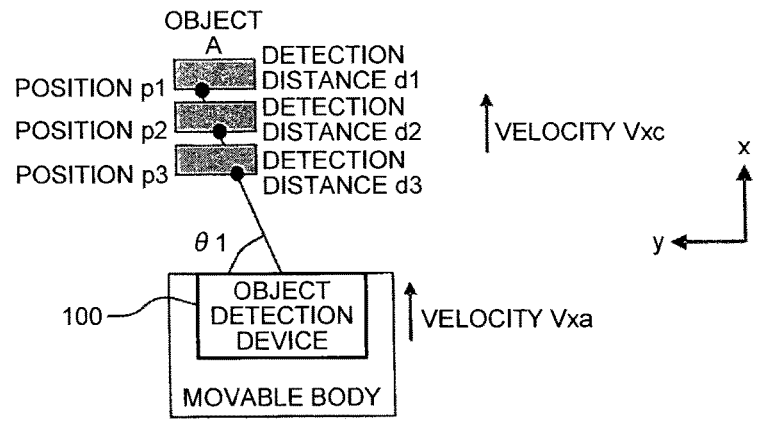
FIG. 11C is a diagram for explaining an example of how to detect the object diagonally in front of the movable body.
Figure 12:
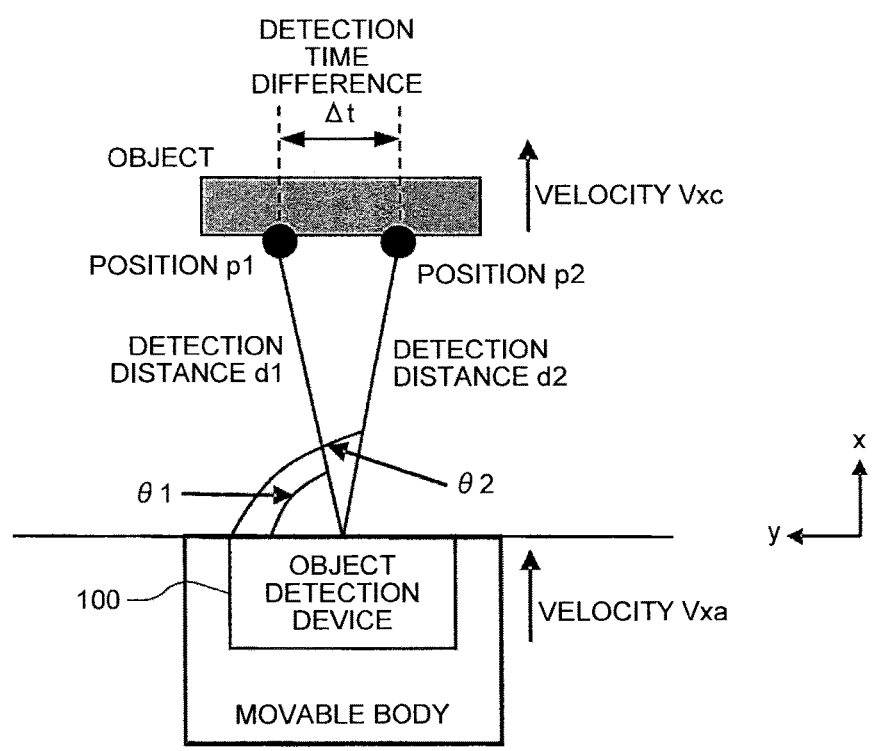
FIG. 12 is a diagram for explaining an example of how to detect different positions of the object in front of the movable body.

Specifically, as illustrated in FIG. 11A to FIG. 12, the relative velocity calculator 60 calculates a relative velocity Vxs between the movable body and the object A from the detection distance d1 of the object A located at a position p1 at the measurement timing t1 and from the detection distance d2 of the object A located at a position p2 at the measurement timing t2. FIG. 11A represents an example of how to detect the object A in front of the movable body (+X side of the movable body), i.e., at θ1=θ2=90 [degree]. FIG. 11C represents an example of how to detect the object A in a predetermined direction intersecting the movement direction of the movable body, i.e., at a scan angle θ1=θ2=θ3 (≠90 [degree]). FIG. 12 represents an example of how to detect the different positions p1 and p2 of the same object, i.e., an example of how to detect the same object at different scan angles θ1 and θ2 (≠θ1).

When Vxa is the velocity of the movable body and Vxc is the velocity of the object A, the relative velocity Vxs between the movable body and the object A can be calculated by the following Equation (2).

$$Vxs = Vxa - Vxc = (d1 \times \sin\theta1 - d2 \times \sin\theta2)/(t2-t1) \quad (2)$$

When detection distances at the same detection positions (same scan angle) between different scans are within a predetermined range or when detection distances at adjacent detection positions are within a predetermined range (substantially the same distance), the detection information can be determined as the detection information of the same object.

Therefore, by measuring and acquiring the velocity Vxa of the movable body, the object velocity calculator 66 can calculate the velocity Vxc of the object A from the following Equation (3).

$$Vxc = Vxa - Vxs \quad (3)$$

At an arbitrary correction timing t3, the detection distance error calculator 62 and the correction distance calculator 64 can calculate a correction distance d2'(t3) of the detection distance d2 of the object A measured at the measurement timing t2 from the following Equation (4).

$$d2'(t3) = d2 - (t3-t2) \times Vxs/\sin\theta2 \quad (4)$$

In the Equation (4), although the values calculated from the measurement timings t1 and t2 are used for the relative velocity Vxs at the correction timing t3, the time difference is also negligible at the correction timing t3, and therefore the values are calculated as the same velocity. When the velocity is changed, the relative velocity at the correction timing t3 may be estimated and calculated from the change amount of the relative velocity obtained before several scans.

FIG. 11A represents the object A repeatedly detected at positions that have the same scan angle as that of the scan 1 for eight scans. As explained above, the movable body mounted with the object detection device 100 is moving at the velocity Vxa and the object A is moving at the velocity Vxc in arrow directions (+X direction), respectively.

In this case, similarly to FIG. 9A, all the scan positions (all measurement points) in the effective scan area (detection range) are detected separately by eight scans of scans 1 to 8. Specifically, by scanning all the scan positions in the effective scan area by eight scans and by causing the LD to emit light to a different scan position in each of the scans, the LD is caused to emit light to all the scan positions in the effective scan area.

Specifically, as illustrated in the left figure of FIG. 11A, in N-th scan 1, the object A located at the position p1 is detected, and the detection distance d1 is calculated.

As illustrated in the right figure of FIG. 11A, in (N+1)-th scan 1 after the eight scans, the object located at the position p2 having the same scan angle as that of the position p1 is again detected, and the detection distance d2 is calculated. In the same manner as above, in (N+2)-th scan 1, an object (not illustrated) located at a position p3 having the same scan angle as that of the position p1 is detected. The calculation results of these detection distances are represented in FIG. 11B.

In this case, the relative velocity information between the object and the movable body mounted with the object detection device 100 can be calculated from the pieces of detection distance information and the pieces of detection time information detected at the positions p1, p2, and p3, all of which has the same scan angle in different scans.

When an object is moving, a moving speed of the object can be calculated from the known velocity of the movable body and the relative velocity information. The error in the detection distance information at an arbitrary time can be corrected by using the calculated relative velocity information.

Because the object is detected at the positions p1 and p2 whose Y coordinates are the same in N-th scan 1 and (N+1)-th scan 1, a time difference between both detections has enough time to perform eight scans. Therefore, the moving distance, i.e., a difference in detection distance between the both detections can have a certain distance if the object is a vehicle. Therefore, as compared with a case where the difference is calculated from a minute time or a small moving distance of adjacent pieces of detection information or the like, the operation accuracy can be improved. Moreover, the same object is detected in a fixed period of different scans and at the same angle of view, and this makes it possible to reduce a calculation load.

Third Example

A third example will be explained next with reference to FIG. 13A to FIG. 13C. The third example is an example of calculating a relative velocity between the movable body and the object based on the results of detecting the object A at positions pn (n≥1) each of which scan angle is the same θ1 in each eight scans as illustrated in FIG. 11C. The calculation of the relative velocity herein can be implemented by the correction system of the measurement controller 46.

Figure 13A:
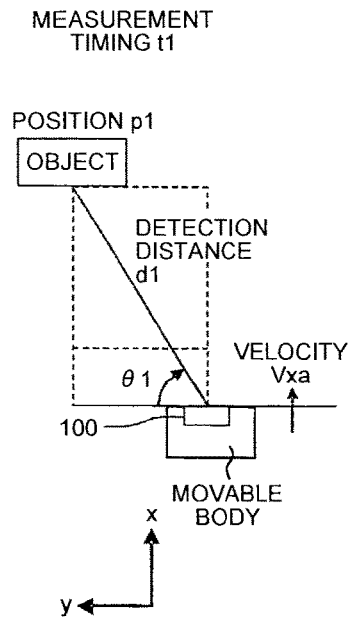
FIG. 13A to FIG. 13C are diagrams (part 1 to part 3) for explaining examples of how to calculate a relative velocity between the movable body and the object from results of detecting an object A at positions pn ($n \geq 1$) each of which the same scan angle is $\theta 1$ every time in each eight scans.
Figure 13B:
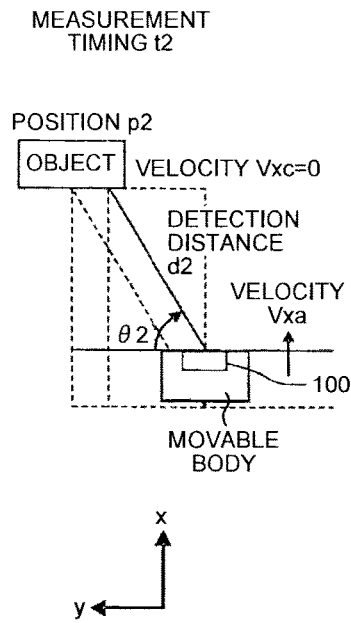

FIG. 13A corresponds to the position p1 of FIG. 11C, and FIG. 13B corresponds to the position p2 of FIG. 11C.

More specifically, FIG. 13A represents an example of how to measure a distance to the object by emitting a pulsed light in a direction of scan angle θ1 at the measurement timing t1. FIG. 13B represents an example of how to measure a distance to the object stood still by emitting a pulsed light in a direction of scan angle θ2 at the measurement timing t2 after the eight scans at the measurement timing t1. FIG. 13C represents an example of how to measure a distance to the object that moves by emitting a pulsed light in the direction of scan angle θ2 at the measurement timing t2 after the eight scans at the measurement timing t1. Herein, the movable body and the object are moving at velocities Vxa and Vxc in the arrow directions (+X direction) of FIG. 13A and FIG. 13C, respectively. In this case, when all the measurement points in the effective scan area are detected separately by eight scans, as illustrated in FIG. 9B, the scan angles θ1 and θ2 at the measurement timings t1 and t2 become equivalent to each other.

Therefore, the relative velocity between the movable body and the object is calculated from the detection information for the two positions p1 and p2, and the velocity of the object is calculated from the relative velocity and the known velocity of the movable body.

Figure 13C:
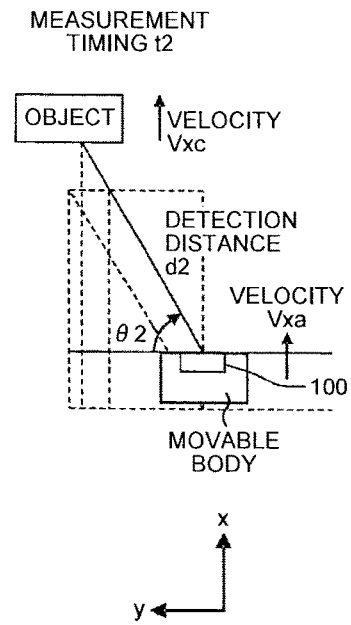

Control Conditions of Object Detection Device
Number of surfaces of rotating mirror=2 [surface]
Rotation speed of rotating mirror=2000 [rpm]
Positions and Velocity Conditions in FIG. 13A and FIG. 13B
Position p1 of scan angle θ1=60 [degree] in FIG. 13A, detected in N-th scan 1
Scan angle θ2=60 [degree] in FIG. 13C, detected in (N+1)-th scan 1
Velocity Vxa of movable body with object detection device=120 [km/h]
Moving velocity of object: Vxc [km/h]
Relative velocity between movable body and object: Vxs [km/h]
Distance Detected upon Measurement
Detection distance d1 at measurement timing t1=100.00 [m]
Detection distance d2 at measurement timing t2=97.70 [m]

The relative velocity Vxs between the movable body and the object can be calculated by the following Equation (5). Because θ1=θ2 herein, by assigning θ1 to θ2, the equation is simplified.

$$Vxs = Vxa - Vxc = \{(d1-d2) \times \sin θ1\}/(t2-t1) \quad (5)$$

Because the rotation time per one surface of the rotating mirror is 0.015 [s], a time from detection of arbitrary one measurement point of the object A to detection of the one measurement point is a time corresponding to the eight scans, which becomes 0.015 [s]×8[scan]=0.12[s].

Therefore, the relative velocity Vxs between the movable body and the object becomes, from the Equation (5), Vxs=(100.00[m]−97.70[m])×sin(2π[rad])×(60 [degree]/360 [degree])/0.12[s]=16.60 [m/s]. When converted to per hour, relative velocity Vxs=60 [km/h]. Thus, the velocity Vxc of the object becomes Vxc=Vxa−Vxs=120−60=60 [km/h].

In this way, the relative velocity between the movable body and the object can be calculated from the result of detecting the same angle positions (positions having the same scan angle) of the object A in different scans.

Fourth Example

A fourth example will be explained below with reference to FIG. 12. The fourth example is an example of how to detect the positions p1 and p2 adjacent to the object, in the same scan, which have the same distance from the movable body mounted with the object detection device 100. The detection herein can be implemented by the measurement controller 46.

The movable body mounted with the object detection device 100 and the object are moving at respective velocities Vxa and Vxc in the arrow directions (+X direction) of FIG. 12.

The object detection device 100 detects an object at the position p1 which is one of measurement points in one scan, and then detects again the same object at the position p2 which is the next measurement point.

Incidentally, when the relative velocity between the movable body mounted with the object detection device 100 and the object is 0 (including the case where both of them stand still), the detection distances d1 and d2 are equal to each other, but when the relative velocity between the movable body and the object is not 0, the detection distances d1 and d2 are not equal to each other. In this case, the relative velocity Vxs can be calculated by the equation: Vxs=Vxa−Vxc=(d1−d2)/Δt.

A detection time difference Δt between the positions p1 and p2 is extremely small because the detection time difference is a detection time difference between the adjacent two measurement points in the same scan, and therefore, a difference between the detection distances d1 and d2 becomes also very small.

In this case, the relative velocity can be calculated in real time through comparison with the above-described example. By using the calculated relative velocity as the relative velocity information, an error between the pieces of detection distance information in a predetermined time can be corrected.

When Vxa is the velocity of the movable body and Vxc is the velocity of the object from the Equation (2), the relative velocity Vxs between the movable body and the object can be calculated by the following Equation (6).

$$Vxs = Vxa - Vxc = (d1 \times \sin θ1 - d2 \times \sin θ2)/(t2-t1) \quad (6)$$

Control Conditions of Object Detection Device

Number of surfaces of rotating mirror=2 [surface]
Rotation speed of rotating mirror=2000 [rpm]
Positions and Velocity Conditions in FIG. 12
Scan angle θ1 at position p1=80 [degree], detected in scan 1 at measurement timing t1
Scan angle θ2 at position p2=100 [degree], detected in scan 1 at measurement timing t2
Velocity Vxa of movable body with object detection device=120 [km/h]
Moving velocity of object Vxc [km/h]
Distance Detected upon Measurement
Detection distance d1 at position p1 at measurement timing t1=100.00 [m]
Detection distance d2 at position p2 at measurement timing t2=99.98 [m]

Because the rotation time per one surface of the rotating mirror is 0.015 [s], a scan time of the positions p1 to p2 becomes 0.015 [s]×(100 [degree]−80 [degree])/360 [degree] =0.000833[s].

At this time, the relative velocity Vxs between the movable body and the object becomes Vxs=(100.00[m]×sin(2π [rad]×80 [degree]/360 [degree]) from Equation (6). When converted to per hour, relative velocity Vxs=85[km/h]. Thus, the velocity Vxc of the object becomes Vxc=Vxa−Vxs=120−85=35[km/h].

Consequently, it is possible to calculate the relative velocity Vxs between the movable body and the object from the result of detecting adjacent positions of the object in the same scan.

At this time, by calculating the relative velocity from, but not limited to information from two points, three or more pieces of detection information when the object has a predetermined size and is also detected at the adjacent measurement points, the detection accuracy can be increased. Moreover, when the object is detected at three or more measurement points in the same scan, the relative velocity only has to be calculated from pieces of detection information for, but not limited to the adjacent measurement points, different measurement points in the same scan.

FIG. 9A represents a case in which the objects A and B are located (stand still) at positions, near both ends of the effective scan area, having the same distance from the object detection device 100 mounted in the movable body. In this case, as illustrated in FIG. 9B and FIG. 9C, the measurement points in the effective scan area are detected separately by eight scans of scans 1 to 8. For example, a first measurement point a on a scan start side and a first measurement point e on a scan end side in FIG. 9A are detected in the scan 1, and a last measurement point c on the scan start side and a last measurement point b on the scan end side are detected in the scan 8. In FIG. 9A, there are six measurement points (not illustrated) firstly detected in the scans 2 to 7 between the measurement point a firstly detected in the scan 1 and the measurement point c firstly detected in the scan 8, and there are six measurement points (not illustrated) lastly detected in the scans 2 to 7 between the measurement point e lastly detected in the scan 1 and the measurement point b lastly detected in the scan 8. The same goes for the scans 2 to 7.

Furthermore, the movable body mounted with the object detection device 100 is moving in the arrow direction (+X direction) of FIG. 9A at the velocity Vx.

Figure 9B:
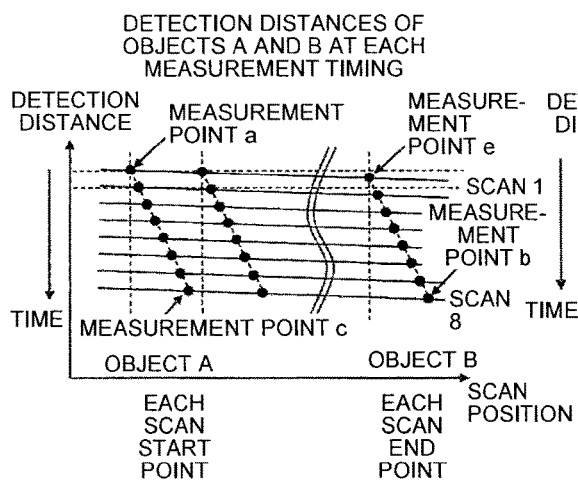

The pieces of detection distance information of the objects A and B at this time are as illustrated in FIG. 9B. In the scan 1, the detection distance is slightly shorter by a distance corresponding to movement of the movable body with a scan time difference at the scan end point (measurement point e) with respect to the scan start point (measurement point a). Likewise, between scans of the scans 1 to 8, the detection distance is shorter by a distance corresponding to movement of the movable body with a scan time difference between the scans. The detection distance information for each measurement point is not updated until the relevant measurement point is next detected after the eight scans. Therefore, an error occurs between the detection distance information at the measurement timing of each measurement point and actual distance information until the measurement point is next detected. FIG. 9C represents actual distances of the objects A and B at the measurement timing (when detected) at the last measurement point b in the scan 8.

Figure 9C:
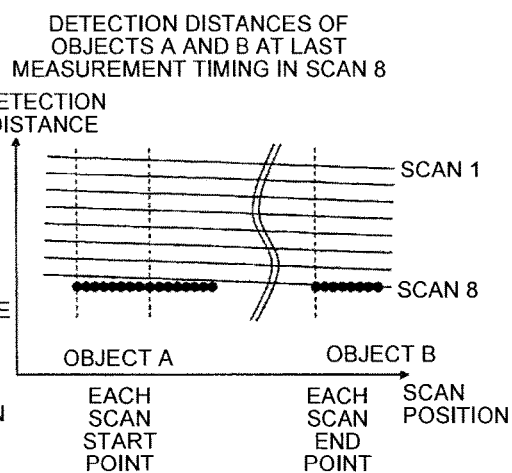

As can be seen by comparing FIG. 9B and FIG. 9C, the error occurs between the detection distance information at the measurement timing of each measurement point and actual distance information at an arbitrary time (current time point).

Ideally, it is desirable to sequentially update detection distance information obtained for each measurement point, but it is difficult considering the processing time and the processing load.

Therefore, by updating the detection distance information at a predetermined timing in a period of time from the time of detecting each of the measurement points until the time of the next detection (before a detection period passes), it is possible to reduce the error between the detection distances without the processing load. FIG. 9C represents an example of how to correct and update the detection distance information at the timing at which the detection of all the measurement points in the effective scan area is finished, and the example has the following advantage.

Figure 14:
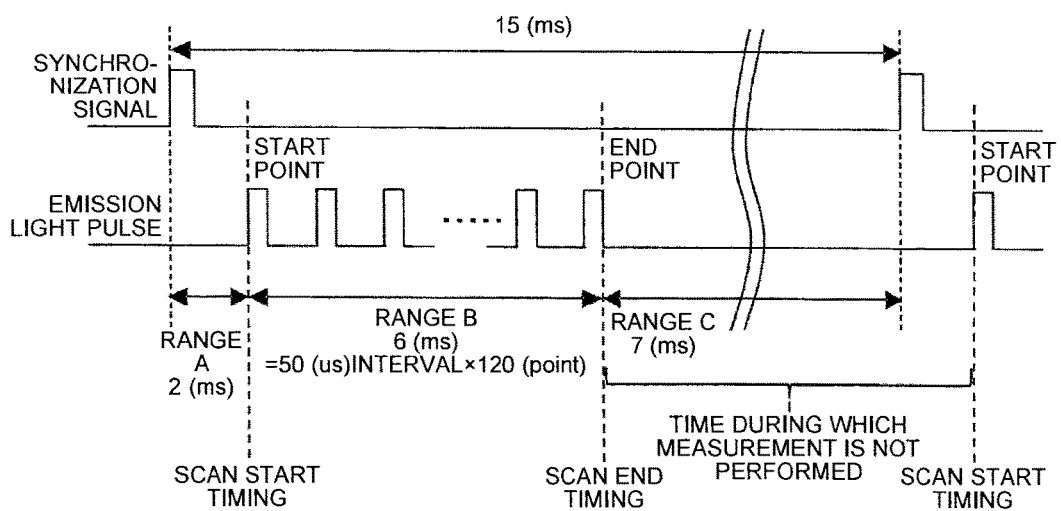
FIG. 14 is a timing chart of a synchronization signal and an emission light pulse.

As can be seen from the timing chart of FIG. 14, the synchronization detection PD 54 receives the light each time the rotating mirror 26 of two surfaces as a deflector illustrated in FIG. 1 goes half around, and the PD output detector 56 detects the light receiving signal (output signal) and outputs the synchronization signal that becomes a start reference of each scan.

A range of light deflected by the rotating mirror 26 is divided into a range A from an output of the synchronization signal to a scan start timing of one scan, a range B which corresponds to the effective scan area and to which the pulsed light is emitted at a predetermined time interval in the scan, and a range C from a scan end timing (since emission of the pulsed light at the last measurement point) in the scan until a next synchronization signal is output.

As can be seen from FIG. 14, based on the structure of the rotating mirror 26, in a period of time from the scan end timing until the next scan start timing, there is a range in which detection (measurement) is not performed for a sufficiently long time with respect to an output interval of the synchronization signal, that is, there is a range in which a range from the output of the next synchronization signal until the next scan start timing is added to the range C.

Figure 15:
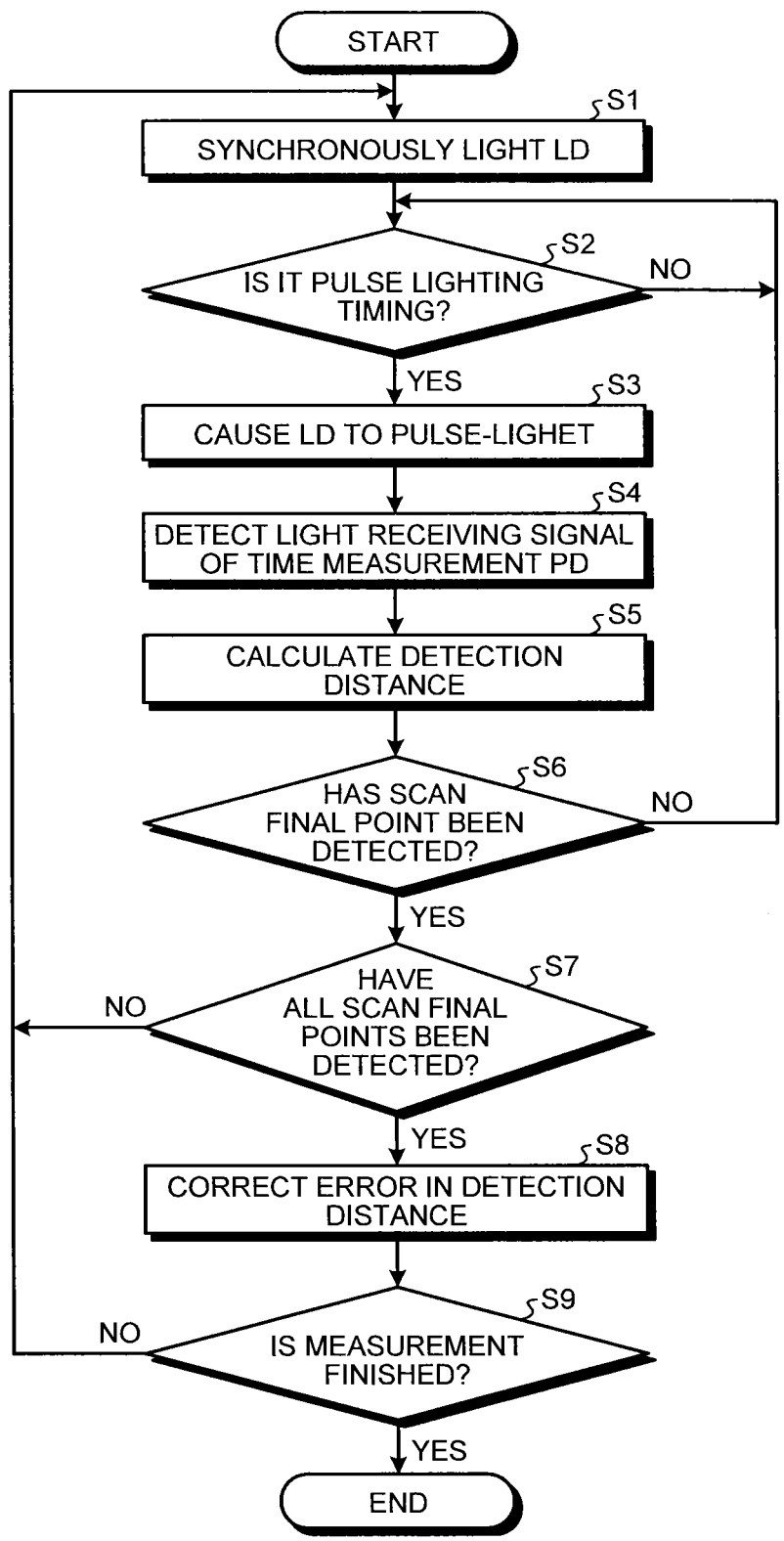
FIG. 15 is a flowchart for explaining an example of an object detection method.

As illustrated in the flowchart of FIG. 15, when the error between the pieces of detection distance information is corrected and updated at a timing of ending detection of all the measurement points (all the scan positions) in the effective scan area (a detection end timing of the last measurement point in the effective scan area), this timing is a timing of separating detections and is possible to obtain more sufficient processing time, in the range where the measurement is not performed, than that of the correction arithmetic processing which is collectively performed. In other words, the processing of detecting the distance information of the object and the processing of correcting the error of the detected distance information (hereinafter, also called "distance information error correction processing") can be separated from each other.

An example of control performed by the object detection device 100 will be simply explained below with reference to FIG. 15. The flowchart of FIG. 15 corresponds to a processing algorithm executed by a CPU (not illustrated) included in the object detection device 100. As explained above, all the measurement points in the effective scan area are detected separately by a plurality of scans.

First, at Step S1, the LD is synchronously turned on. In other words, the light reflected by the rotating mirror 26 is made to enter the synchronization detection PD 54. This processing is performed when the synchronization signal is input.

Then, at Step S2, it is determined whether it is pulse lighting timing. The determination herein is YES when the pulse lighting signal is input. When the determination at Step S2 is YES, the process proceeds to Step S3. Meanwhile, when the determination at Step S2 is NO, the same determination is again performed.

At Step S3, pulse lighting is performed on the PD. Thereby the LD emits light to a plurality of measurement points (scan positions) in the effective scan area, and the measurement points are detected.

Then, at Step S4, a light receiving signal of the time measurement PD 42 is detected. Specifically, the PD output detector 44 detects the rising waveform portion of the light receiving signal of the time measurement PD 42.

At Step S5, a detection distance is calculated. Specifically, the measurement controller 46 calculates a reciprocation distance to the object from a time difference between emission timing of the LD (a rising timing of the pulse lighting signal) and a rising timing of the detection signal of the PD output detector 44.

At Step S6, it is determined whether a scan final point has been detected. In other words, it is determined whether the last measurement point in one scan has been detected. When the determination at Step S6 is YES, the process proceeds to Step S7. Meanwhile, when the determination at Step S6 is NO, the process returns to Step S2.

At Step S7, it is determined whether all the scan final points have been detected. In other words, it is determined whether detection of the last measurement point in the last scan is finished. When the determination at Step S7 is YES, the process proceeds to Step S8. Meanwhile, when the determination at Step S7 is NO, the process proceeds to Step S1.

At Step S8, the error in the detection distance is corrected. Specifically, the correction distance (actual distance) is calculated in the above manner, and the detection distance is updated with the correction distance.

At Step S9, it is determined whether the measurement is finished. The determination herein is YES when, for example, the movable body mounted with the object detection device 100 is stopped, or the like. When the determination at Step S9 is YES, the flow is ended. Meanwhile, when the determination at Step S9 is NO, the process returns to Step S1.

Figure 16A:
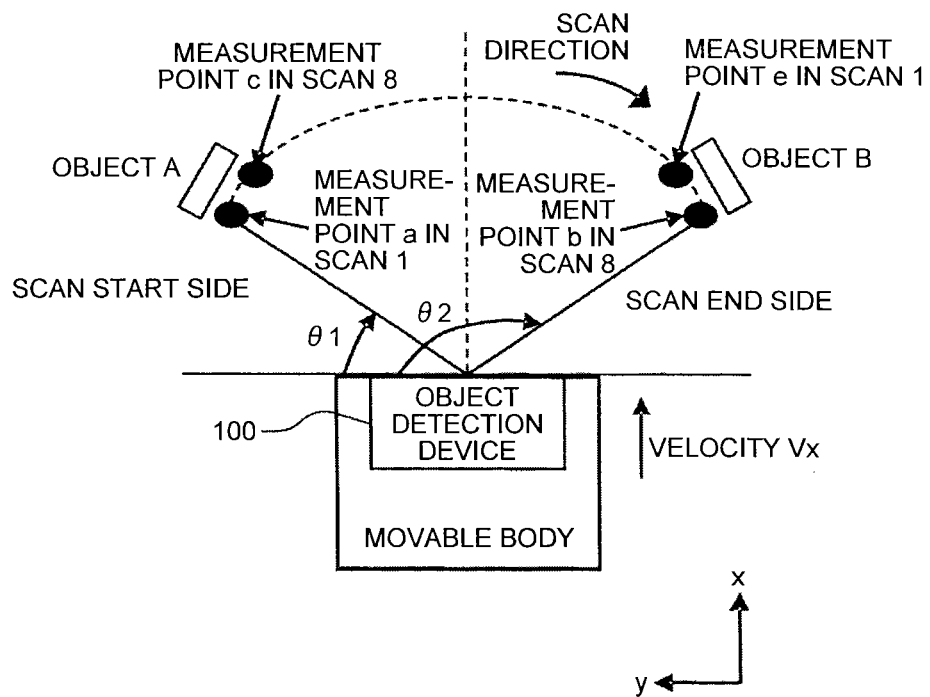
FIG. 16A and FIG. 16B are diagrams (part 1 and part 2) for explaining examples of how to detect objects A and B near both ends of an effective scan area.

FIG. 16A represents an example in which the objects A and B are located (stand still) at positions with the same distance to the movable body, near both ends of the effective scan area. As illustrated in FIG. 16B to FIG. 17B, all the measurement points in the effective scan area are detected separately by eight scans of scans 1 to 8. For example, in FIG. 16A, the first measurement point a on the scan start side and the first measurement point e on the scan end side are detected in the scan 1, and the last measurement point c on the scan start side and the last measurement point b on the scan end side are detected in the scan 8. In FIG. 16A, there are six measurement points (not illustrated) first detected in the scans 2 to 7 between the measurement point a first detected in the scan 1 and the measurement point c first detected in the scan 8, and there are six measurement points (not illustrated) last detected in the scans 2 to 7 between the measurement point e last detected in the scan 1 and the measurement point b last detected in the scan 8. The same goes for the scans 2 to 7.

Furthermore, the movable body mounted with the object detection device 100 is moving in the arrow direction (+X direction) of FIG. 16A at the velocity Vx.

Figure 16B:
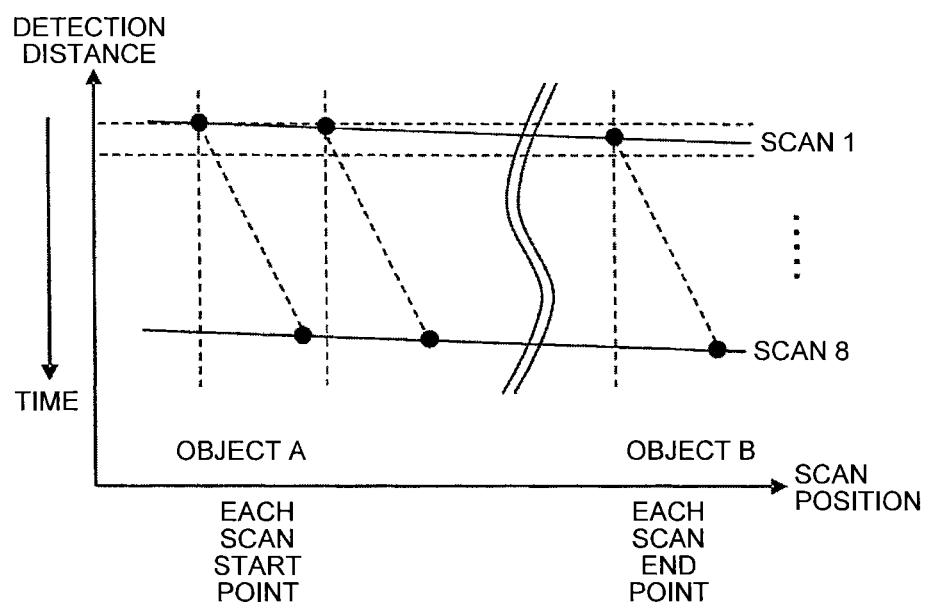

The detection distance information at this time is as illustrated in FIG. 16B. In each scan of the scans 1 to 8, the detection distance is slightly shorter by a distance corresponding to movement of the movable body with a scan time difference at the scan end point with respect to the scan start point.

Likewise, between the scans of the scans 1 to 8, the detection distance becomes shorter by a distance corresponding to movement of the movable body with a time difference between the scans. These pieces of detection distance information are not updated until they are again measured after the eight scans are performed at the respective measurement points.

Therefore, an error occurs between the detection distance information detected at a predetermined timing and actual distance information at an arbitrary time.

Then by updating the detection distance with the correction distance at arbitrary timing earlier than the passage of the detection period since the detection of each of the measurement points, the error in the detection distance can be reduced.

Figure 17A:
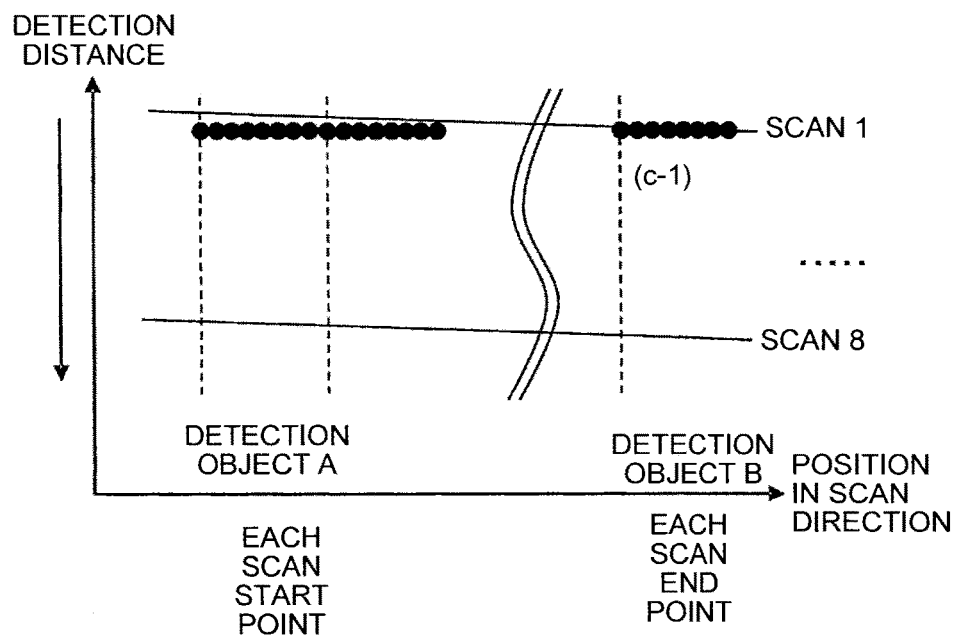
FIG. 17A and FIG. 17B are diagrams (part 3 and part 4) for explaining examples of how to detect the objects A and B near both ends of the effective scan area.
Figure 17B:
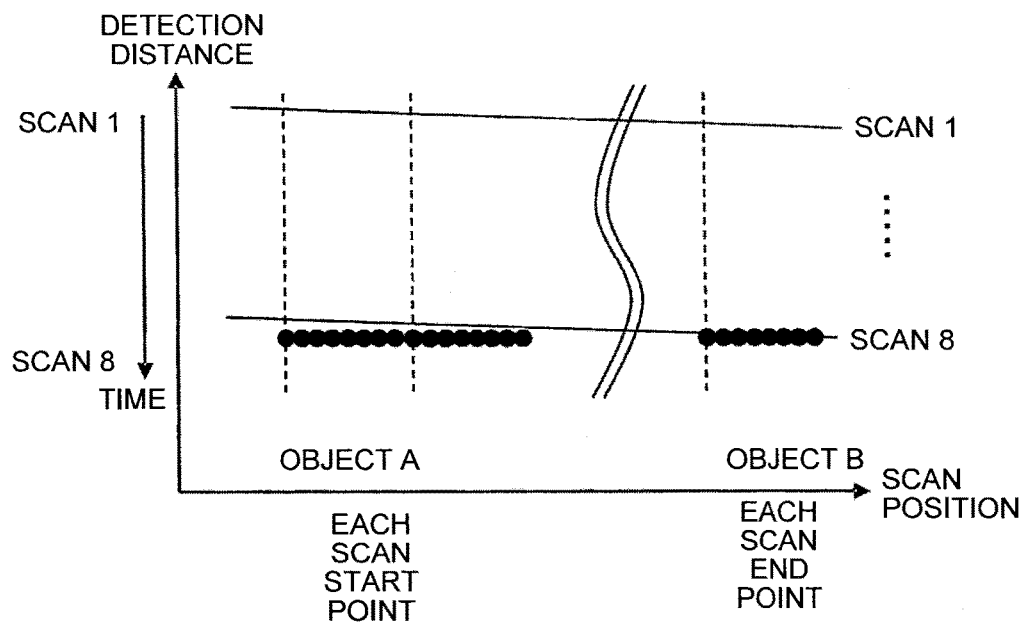

FIG. 17A represents an example of how to correct the error in the detection distance information for the measurement points in the scan 1 when the last measurement point of the scan 1 performed on the effective scan area is detected. FIG. 17B represents an example of how to correct the error in the detection distance information for the measurement points in the scan 8 when the last measurement point in the scan 8 performed on the effective scan area is detected. In FIG. 17A and FIG. 17B, the error in the detection distance information for all the measurement points detected in a scan for each of the scans performed on the effective scan area is corrected. However, as the method of correcting the error in the detection distance information, the error in the detection distance information for all the measurement points in the effective scan area may be corrected when all the scans performed on the effective scan area are finished. However, when the error in the detection distance information is corrected at the time of detecting the last measurement point in each scan, the advantage is also as follows.

Figure 18:
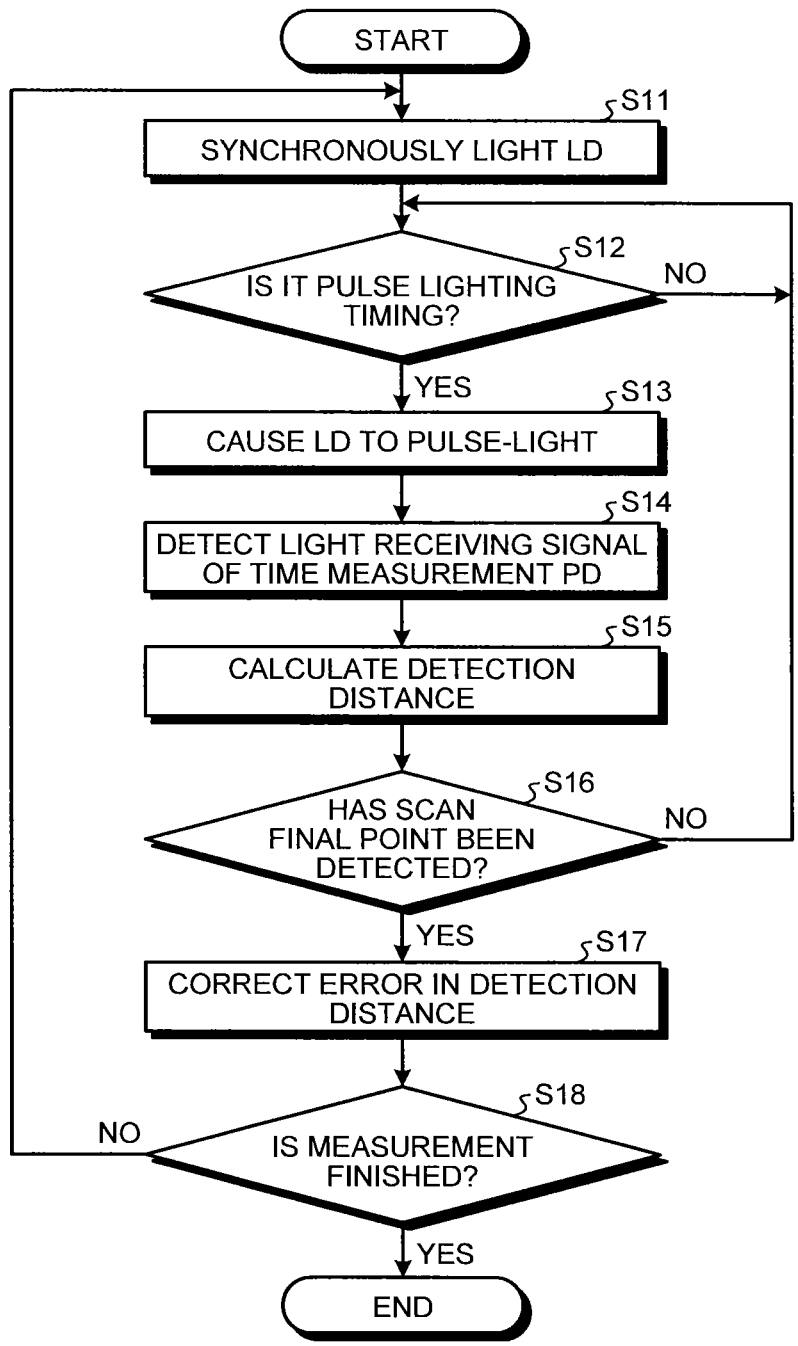
FIG. 18 is a flowchart for explaining another example of the object detection method.

Specifically, as illustrated in the flowchart of FIG. 18, when the error in the detection distance information is corrected at the time of detecting the last measurement point in each scan in the effective scan area (at the time of detecting the last measurement point in each scan), this correction is a timing of separating measurements and is possible to obtain enough processing time for collectively performing the correction arithmetic processing in the range where the measurement is not performed (see FIG. 14). In other words, the distance detection processing of the object and the distance information error correction processing can be separated from each other.

Another example of the control performed by the object detection device 100 will be simply explained below with reference to FIG. 18. The flowchart of FIG. 18 corresponds to the processing algorithm executed by the CPU (not illustrated) included in the object detection device 100. As explained above, all the measurement points in the effective scan area are detected separately by a plurality of scans.

First, at Step S11, the LD is synchronously turned on. In other words, the light reflected by the rotating mirror 26 is made to enter the synchronization detection PD 54. This processing is performed when the synchronization signal is input.

Then, at Step S12, it is determined whether it is pulse lighting timing. The determination herein is YES when the pulse lighting timing is input. When the determination at Step S12 is YES, the process proceeds to Step S13. Meanwhile, when the determination at Step S12 is NO, the same determination is again performed.

At Step S13, pulse lighting is performed on the PD. Thereby the LD emits light to a plurality of measurement points (scan positions) in the effective scan area, and the measurement points are detected.

Then, at Step S14, the light receiving signal of the time measurement PD 42 is detected. Specifically, the rising waveform portion of the light receiving signal of the time measurement PD 42 is detected by the PD output detector 44.

At Step S15, the detection distance is calculated. Specifically, the measurement controller 46 calculates a reciprocation distance to the object from a time difference between emission timing of the LD (a rising timing of the pulse lighting signal) and a rising timing of the detection signal of the PD output detector 44.

At Step S16, it is determined whether a scan final point has been detected. In other words, it is determined whether the last measurement point in one scan has been detected. When the determination at Step S16 is YES, the process proceeds to Step S17. Meanwhile, when the determination at Step S16 is NO, the process returns to Step S12.

At Step S17, the error in the detection distance is corrected. Specifically, the correction distance (actual distance) is calculated in the above manner, and the detection distance is updated with the correction distance.

At Step S18, it is determined whether the measurement is finished. The determination herein is YES when, for example, the movable body mounted with the object detection device 100 is stopped, or the like. When the determination at Step S18 is YES, the flow is ended. Meanwhile, when the determination at Step S18 is NO, the process returns to Step S11.

Incidentally, unlike the case of merely measuring the distance with high accuracy, the object detection device is required to, for example, identify an object from such pieces of information as the presence or absence of the object, the moving speed, and the size, in the in-vehicle use. In this case, the distance information indicating a distance to the object is necessary, but, as compared with the case in which the object is located near from the device, highly accurate distance information of about tens of centimeters is not generally needed in real time.

Figure 19:
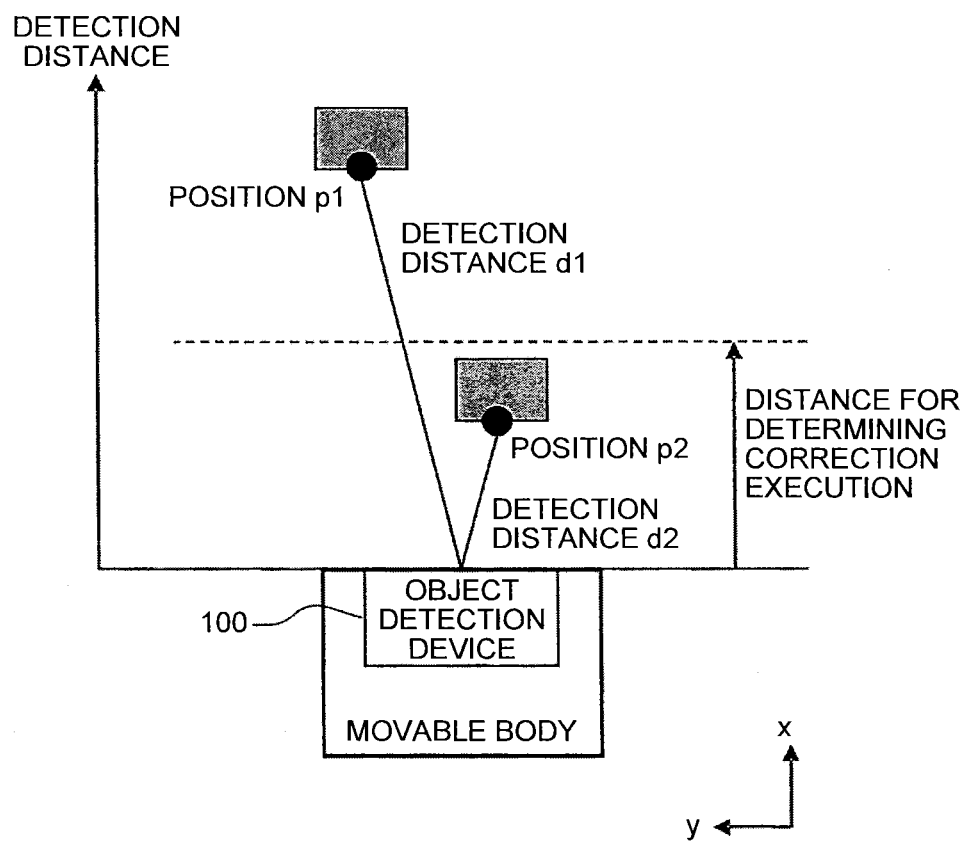
FIG. 19 is a diagram for explaining a method of determining the presence or absence of correction execution.

Therefore, as illustrated in FIG. 19, when the object is detected at a distance that is shorter than a preset distance for determining correction execution, the error in detection is corrected, and when the object is detected at a distance that is equal to or longer than the preset distance, the distance information may be updated at the time of next detection (at the timing of obtaining the detection information for the same measurement point) without correcting the error in detection in order to reduce the processing load.

The preset distance for determining correction execution may be variably controlled depending on the velocity of the movable body, the other usage conditions, use environment, or the like.

Figure 20:
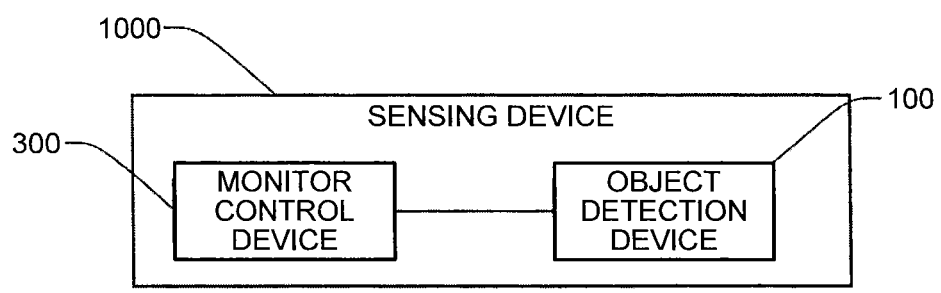
FIG. 20 is a diagram for explaining a sensing device.

FIG. 20 represents a sensing device 1000 provided with the object detection device 100. The sensing device 1000 is mounted in the movable body and is provided with a monitor control device 300 electrically connected to the object detection device 100 in addition to the object detection device 100. The object detection device 100 is fixed to a portion near a bumper or near a back mirror of a vehicle. The monitor control device 300 performs processing such as estimation of a shape and a size of the object, calculation of position information for the object, calculation of movement information, and recognition of the type of the object based on the detection result of the object detection device 100, and determines the presence or absence of danger. When it is determined that there is a danger, the monitor control device 300 issues an alert such as an alarm to an operator of the movable body so as to call his/her attention to the danger, issues an instruction to turn a steering wheel to avoid the danger to a steering controller of the movable body, or issues an instruction to apply braking to the ECU of the movable body. The sensing device 1000 is supplied with power from, for example, a battery of the vehicle.

The monitor control device 300 may be provided integrally with the object detection device 100 or may be provided separately from the object detection device 100. Moreover, the monitor control device 300 may perform at least part of the control performed by the ECU.

The object detection device 100 according to the present embodiment explained above includes the optical scanning system 200, the detection system 40, and the measurement controller 46. The optical scanning system 200 includes the LD, the LD drive unit 12 for controlling the LD, and the rotating mirror 26 for deflecting the light from the LD and that causes the LD to emit light a measurement point (scan position) different for each scan of a plurality of scans performed on the effective scan area, so as to emit light to all the measurement points (scan positions) with in the effective scan area. The detection system 40 detects the light emitted from the optical scanning system 200 and reflected by the object at the scan position. The measurement controller 46 calculates the distance information indicating a distance to the object based on the emission timing of the LD and the detection timing of the detection system 40. The measurement controller 46 includes the correction system configured to correct the distance information for at least one of the measurement points to which the LD is caused to emit light in at least one scan of the scans.

The object detection method according to the present embodiment includes causing the LD to emit light to a measurement point (scan position) different for each scan of a plurality of scans performed on the effective scan area, so as to emit light to a plurality of measurement points (scan positions) within the effective scan area; detecting the light emitted from the LD and reflected by an object located at the measurement point; and calculating distance information indicating a distance to the object based on an emission timing of the LD and a detection timing of the light. The calculating includes correcting the distance information for at least one of the measurement points to which the LD is caused to emit light in at least one scan of the scans.

According to the object detection device 100 and the object detection method of the present embodiment, because all the measurement points in the effective scan area are detected separately by the plurality of scans, it is possible to reduce the number of measurement points in each scan (a time interval of the measurement timing is made long), and to correct the distance information for each measurement point within the period from the detection of the measurement point until the next detection (within the detection period).

As a result, both the longer distance and the higher accuracy of the detection distance can be achieved.

The object detection device 100 is mounted in the movable body, and the correction system calculates relative velocity information between the movable body and the object and can correct the distance information based on the relative velocity information.

In this case, it is possible to calculate the relative velocity information between the movable body and the object and correct the distance information for the measurement point within the period from the detection of the measurement point until the next detection (within the detection period), thus accurately obtaining the position information (distance information) for the measurement point within the detection period of each measurement point.

The relative velocity calculator 60 calculates the relative velocity information between the movable body and the object based on the distance information for the same measurement point to which the LD emits light in the effective scan area in at least two scan cycles when the plurality of scans are set as one scan cycle.

In this case, it is possible to improve the detection accuracy of the relative velocity information, and thus the position information for each measurement point can be obtained more accurately.

The relative velocity calculator 60 calculates the relative velocity information between the movable body and the object based on the distance information for at least two measurement points in the effective scan area.

In this case, the freedom of detection of the relative velocity information (freedom of selection of measurement points) can be increased. In other words, it is possible to adjust the detection accuracy and the detection time depending on the selection of measurement points (the number thereof or a combination thereof).

When at least two measurement points in the effective scan area are emitted with the LD in the same scan, it is possible to more quickly calculate the relative velocity information, and thus the position information for each measurement point can be obtained earlier.

Furthermore, when at least two measurement points in the effective scan area are adjacent to each other, it is possible to calculate the relative velocity information in real time, and thus the position information for each measurement point can be obtained in substantially real time.

Moreover, the correction system corrects the distance information after the optical scanning system causes the LD to emit light to all the measurement points.

In this case, because the error in the detection distance information for all the already detected measurement points can be corrected at the timing at which the detection of all the measurement points in the effective scan area is finished, the position information for the object can be accurately obtained for each refresh rate. In addition, because the error in the detection distance information can be corrected within the period of time from the last measurement point measured by the current reflective surface (scanning surface) of the rotating mirror 26 until the first measurement point measured by the next scanning surface, a sufficient correction operation time can be obtained.

The correction system corrects the distance information after the optical scanning system causes the LD to emit light to the last measurement point in each of the scans.

In this case, because the error in the detection distance information for all the already detected measurement points can be corrected at the timing at which the detection of all the measurement points measured by one scan is finished, the position information for the object can be accurately obtained in a period earlier than the end of measurement of all the measurement points. In addition, because the error in the detection distance information can be corrected within the period of time from the last measurement point measured by the current scanning surface (reflective surface) of the rotating mirror 26 until the first measurement point measured by the next scanning surface, a sufficient correction operation time can be obtained.

When the distance information for at least one measurement point of a correction target is equal to or larger than a threshold (distance for determining correction execution), the correction system does not correct the distance information.

In this case, when there is a sufficient time for avoidance of danger such as collision like a case in which the distance to the object is long, it is only determined whether the object is present and the error in detection is not corrected, and therefore it is possible to reduce the control processing load.

The optical scanning system further includes a light receiving system (synchronization system 50) including the synchronization detection PD 54 for receiving, when an LD is caused to emit light outside the effective scan area, the light from the LD, and the PD output detector 56. The optical scanning system determines a scan start timing for the effective scan area in each of the scans based on the output signal (synchronization signal) of the light receiving system.

In this case, for example, a rotary encoder for detecting a rotation angle position of the rotating mirror 26 is not needed, and therefore, the device can be downsized, and particularly thinned.

The optical scanning system outputs, to the LD, periodic pulse signals which are delayed from the output signal of the light receiving system and have different delay times between the scans, so as to cause the LD to emit light to all the measurement points in the effective scan area.

In this case, thinning scanning can be performed on all the measurement points in the effective scan area using a simple method.

According to the sensing device 1000 that includes the object detection device 100 and the monitor control device 300 for calculating at least one of the presence or absence of an object, the position of the object, and the moving speed of the object based on the output of the object detection device 100, it is possible to achieve both the longer distance and the higher accuracy of the detection distance.

The sensing device 1000 is mounted in the movable body, and the monitor control device 300 determines the presence or absence of danger based on at least either one of the position information and the movement information of the object. Therefore, the information effective in avoidance of danger can be provided to, for example, a steering control system and a speed control system of the movable body.

The movable body device including the object detection device 100 and the movable body mounted with the object detection device 100 is excellent in collision safety.

The movable body device including the sensing device 1000 and the movable body mounted with the sensing device 1000 is excellent in collision safety.

In the object detection device 100 according to the embodiments, when all the measurement points in the effective scan area are detected separately by a plurality of scans, a detection distance at at least one measurement point to which the LD emits light in at least one scan of the scans only has to be corrected.

For example, in one scan, only detection distances at a plurality of measurement points (e.g., three) of both ends and the center of the effective scan area may be corrected. In this case, for example, detection distances at the other measurement points in the effective scan area may be corrected by a linear approximation to the three correction distances.

In the embodiments, the detection distance is corrected with a pause between scans (at the end of each scan or at the end of all the scans); however, the embodiments are not limited thereto. For example, the detection distance may be corrected in the middle of at least one scan.

The embodiments have explained the case where the movable body and the object have only a velocity component in the X-axis direction; however, even when the movable body and the object have velocity components in the Y-axis direction and the Z-axis direction, it is also possible to detect the object, correct the detection distance, and the like, using the same method.

The configuration of the object detection device according to the embodiments can be appropriately changed.

For example, in the embodiments, a single LD is used as the light source; however, the embodiments are not limited thereto. For example, it may be configured to use an LD array in which a plurality of LDs are one-dimensionally or two-dimensionally arranged, a vertical-cavity surface-emitting laser (VCSEL), a VCSEL array in which VCSELs are one-dimensionally or two-dimensionally arranged, any laser other than a semiconductor laser, and any light source other than a laser. The LD array in which the LDs are one-dimensionally arranged includes a stack type LD array in which a plurality of LDs are stacked and an LD array in which a plurality of LDs are horizontally arranged.

The light projecting optical system does not need to have a coupling lens or may have other lenses.

The light projecting optical system and the light receiving optical system do not need to have a reflecting mirror. In other words, the light from the LD may be incident on the rotating mirror without folding the light path.

The light receiving optical system does not need to have a light receiving lens or may have other optical elements (e.g., light collecting mirror).

As a deflector, other mirrors may be used, such as a polygon mirror (rotating polygon mirror), a Galvano mirror, and a Micro Electro Mechanical Systems (MEMS) mirror instead of the rotating mirror.

The synchronization system does not need to have a synchronization lens or may have other optical elements (e.g., light collecting mirror).

The embodiments have explained the example of an automobile as a movable body mounted with the object detection device; however, the movable body may be any vehicle other than the automobile, an aircraft, a ship, and the like.

The specific numerals and shapes used in the explanation are only examples, and therefore, it goes without saying that the specific examples can be arbitrarily modified without departing from the spirit of the present invention.

As is clear from the explanation above, the object detection device, the object detection method, and the sensing device according to the embodiments are technology using a so-called Time of Flight (TOF) method for measuring a distance to an object, and this technology is widely used in an industrial field such as a motion capture technology, a range finder, and a three-dimensional shape measurement technology in addition to sensing in the movable body. In other words, the object detection device according to the present invention is not necessarily mounted in the movable body.

A thought process through which the inventors invent the embodiments will be explained below.

In recent years, the development of a laser radar as an on-board unit for detecting the presence or absence of an object in front of a running vehicle or for detecting the distance to the object is actively conducted. Various types are known as an optical system for the laser radar. However, as disclosed in Japanese Patent Application Laid-open No. 2011-128112, Japanese Patent Application Laid-open No. 2009-063339, Japanese Patent Application Laid-open No. 2012-107984, and Japanese Patent Application Laid-open No. 2009-069003, a laser beam emitted from a light source is scanned by a rotating mirror, the beam reflected or scattered by the object is again detected by an optical detector through the rotating mirror, and it is thereby possible to detect the presence or absence of an object in a desired range and the distance to the object. In this way, a scan type laser radar for scanning both the laser beam emitted from the light source and the detectable range capable of being detected by the optical detector can focus the laser beam only on a detection required portion. Therefore, the scan type laser radar is effective in detection accuracy and detection distance, and because an area detectable by the optical detector can be minimized, it is also effective in reducing the cost of the optical detector.

As a method of determining an angular position of the effective scan area with high accuracy, there is a method of using a synchronization detection PD as described in, for example, Japanese Patent Application Laid-open No. 2006-215483. The method of using the synchronization detection PD is implemented by providing a synchronization detection PD on the upstream side of the rotating mirror in its rotation direction and starting optical scanning after a given timing since detection of a signal by the synchronization detection PD.

However, in this method, it is necessary to lengthen an interval of emitting a pulsed light due to limitation of the duty specifications of an LD in order to increase an LD output for the purpose of making the detection distance longer, and it is also necessary to emit pulsed lights separately for a plurality of scans in order to take a large number of measurement points in the effective scan area.

Then, when all the measurement points in the effective scan area are detected separately by the scans, an error occurs between current position information and obtained detection distance information in a predetermined time. Particularly, a time difference between a measurement point in the first scan and a measurement point in the last scan is increased. Therefore, although the detection distance information for the last detected measurement point accurately obtains the current distance, the detection distance information for the first detected measurement point has a problem that the error increases when the movable body and the object are moving.

Thus, the inventors have invented the embodiments in order to deal with the problem.

According to the present invention, it is possible to achieve both the longer distance and the higher accuracy of the detection distance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An object detection device mounted on a movable body and comprising:
    an optical scanning system that includes a light source, a light source drive unit configured to drive the light source, and a deflector configured to deflect light from the light source, and causes the deflector to scan a scan area with light from the light source at a plurality of scan positions of the deflector;
    a detection system that detects the light emitted from the optical scanning system and reflected by an object; and
    a processing device that calculates distance information indicating a distance to the object based on an emission timing of the light source and a detection timing of the detection system,
    wherein the movable body moves relative to the object, and
    wherein the optical scanning system conducts a plurality of scans including a first scan and a second scan, the first scan occurring earlier than the second scan, the optical scanning system causes the light source to emit light at a different scan position of the deflector in each scan, the processing device includes a correction system configured to correct the distance information from the first scan based on the distance information from the second scan and to correct error arising from movement of the movable body between the first scan and the second scan.

2. The object detection device according to claim 1, wherein the optical scanning system further includes a light receiving system that receives the light from the light source when the light source is caused to emit light outside the scan area, and determines a scan start timing for the scan area in each of the scans based on an output signal of the light receiving system.

3. The object detection device according to claim 2, wherein the optical scanning system outputs, to the light source, periodic pulse signals which are delayed from the output signal and have different delay times between the scans, so as to cause the light source to emit light at the scan positions.

4. The object detection device according to claim 1, wherein the correction system corrects the distance information at the at least one of the scan positions in a period of time from calculation of the distance information until next emission of the light source at the at least one of the scan positions.

5. The object detection device according to claim 1, wherein the correction system corrects the distance information at the at least one of the scan positions based on relative velocity information between the movable body and the object.

6. The object detection device according to claim 1, wherein, when the scans are set as a single scan cycle, the correction system calculates the relative velocity information based on the distance information at the same scan position in at least two scan cycles.

7. The object detection device according to claim 1, wherein, when the scans are set as a single scan cycle, the correction system calculates the relative velocity information based on the distance information at at least two of the scan positions in the same scan cycle.

8. The object detection device according to claim 7, wherein the light source is caused to emit light in the same scan at the at least two scan positions.

9. The object detection device according to claim 8, wherein the at least two scan positions are adjacent to each other.

10. The object detection device according to claim 1, wherein the correction system corrects the distance information after the optical scanning system causes the light source to emit light at the scan positions.

11. The object detection device according to claim 1, wherein the correction system corrects the distance information after the optical scanning system causes the light source to emit light to the last one of the scan positions in each of the scans.

12. The object detection device according to claim 1, wherein, when the distance information at the at least one scan position is equal to or larger than a threshold, the correction system does not correct the distance information.

13. The object detection device according to claim 1, wherein the deflector is a rotational deflector, and the scan position is a rotational position of the rotational deflector.

14. A sensing device comprising: the object detection device according to claim 1; and a monitor control device that calculates at least one of presence or absence of an object, a position of the object, and a moving velocity of the object based on an output of the object detection device.

15. The sensing device according to claim 14, wherein the monitor control device determines presence or absence of danger based on at least one of the position information and movement information of the object.

16. An object detection method comprising:
    providing a movable body with a light source and a deflector;
    causing the light source to emit light and causing the deflector to scan a scan area with the light from the light source;
    detecting during movement of the movable body the light emitted from the light source and reflected by an object; and
    calculating distance information indicating a distance to the object based on an emission timing of the light source and a detection timing of the light,
    wherein in a plurality of scans including a first scan and a second scan, the first scan occurring earlier than the second scan, the causing includes causing the light source to emit light at a different scan position of the deflector in each scan, the calculating includes correcting the distance information from the first scan based on the distance information from the second scan and to correct error arising from movement of the movable body between the first scan and the second scan.

17. The object detection method according to claim 16, wherein the correcting includes correcting the distance information for the at least one of the scan positions in a period of time from calculation of the distance information until next emission of the light source at the at least one of scan positions.

* * * * *